United States Patent [19]

Lindauer et al.

[11] 4,453,909

[45] Jun. 12, 1984

[54] APPARATUS FOR MAKING SOAP WITH PERFUMED INSERT

[75] Inventors: Jerome I. Lindauer, Hillsdale; Ira D. Hill, Locust; Arthur L. Liberman, Highlands, all of N.J.

[73] Assignee: International Flavors & Fragrances Inc., New York, N.Y.

[21] Appl. No.: 505,422

[22] Filed: Jun. 16, 1983

Related U.S. Application Data

[62] Division of Ser. No. 362,263, Mar. 26, 1982, Pat. No. 4,438,010.

[51] Int. Cl.³ .......................... B29C 3/00; B29D 3/00; B29D 31/00

[52] U.S. Cl. ...................................... 425/511; 252/92; 252/132; 252/134; 252/DIG. 16; 425/112; 425/113; 425/122; 425/296; 425/298; 425/376 R

[58] Field of Search ............... 425/289, 511, 4 C, 112, 425/113, 115, 122, 296, 298, 376 R, 509; 252/92, 174, DIG. 16, 132, 134

[56] References Cited

U.S. PATENT DOCUMENTS

| | | | |
|---|---|---|---|
| 2,414,098 | 1/1947 | Garvey et al. | 252/134 |
| 2,497,212 | 2/1950 | Donofrio | 425/289 |
| 2,624,164 | 1/1952 | Donofrio | 425/289 |
| 3,413,230 | 11/1968 | Dupuis | 252/134 |
| 3,769,225 | 10/1973 | Matthaei | 252/134 |
| 3,835,058 | 9/1974 | White | 252/174 |
| 3,993,722 | 11/1976 | Borcher et al. | 252/134 |
| 4,077,754 | 3/1978 | Borcher et al. | 425/376 R |
| 4,247,498 | 1/1981 | Castro | 264/28 |
| 4,277,358 | 7/1981 | Hopkins | 252/92 |

*Primary Examiner*—Willard E. Hoag

*Attorney, Agent, or Firm*—Arthur L. Liberman

[57] ABSTRACT

Apparatus for making a tablet of soap containing a perfume-containing core, hollow or solid, fabricated from a hard plastic material, either thermosetting or thermoplastic. Soap from the resulting composite tablet is usable until the core is washed clean and is aromatized until the core is washed clean. This obviates the wastage of soap which normally occurs as a conventional soap tablet becomes very thin on use and, at the same time, gives rise to a continuously aromatized soap tablet.

2 Claims, 35 Drawing Figures

FIG. 1
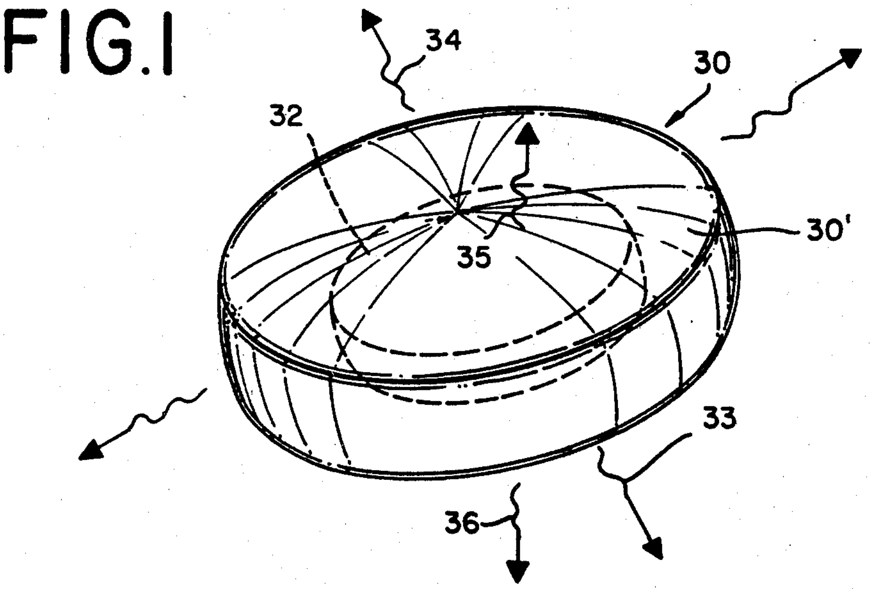
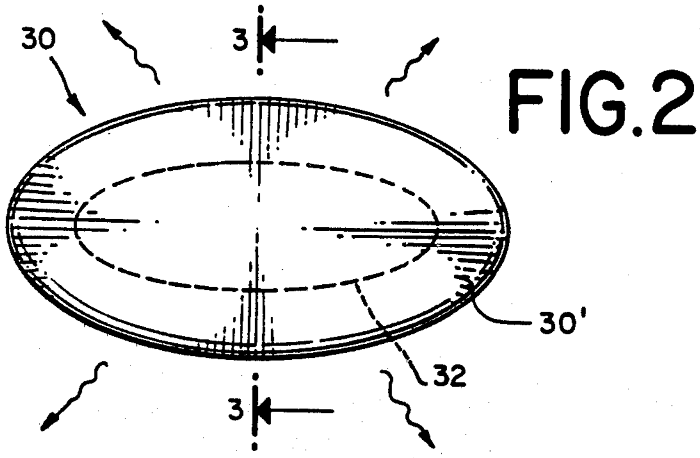
FIG. 2
FIG. 3
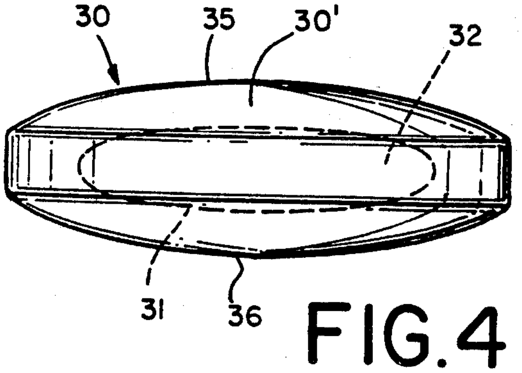
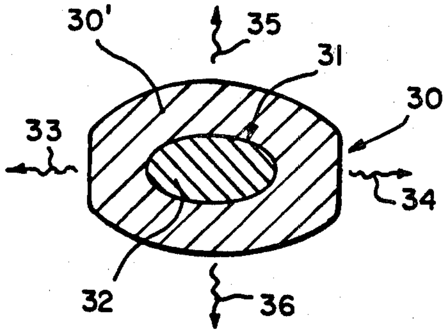
FIG. 4

FIG.5
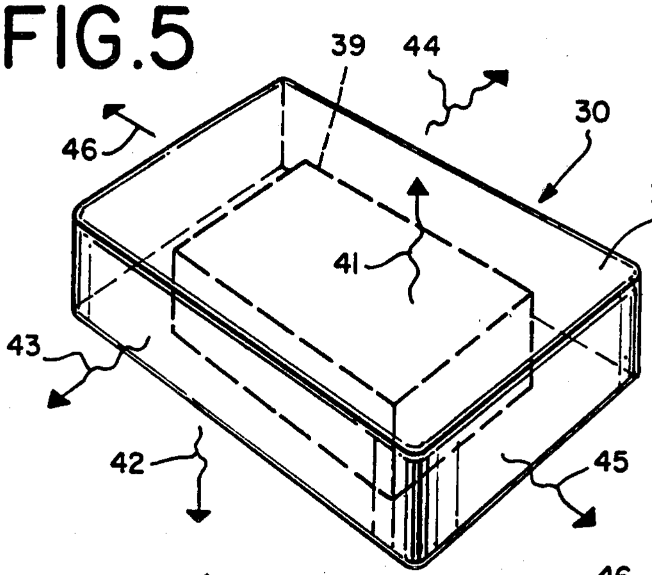
FIG.6
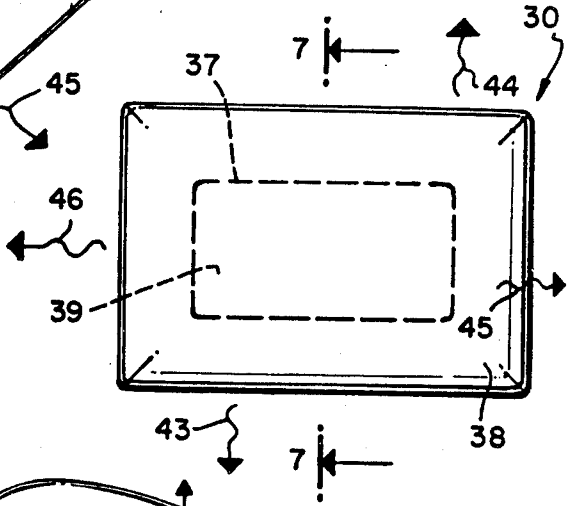
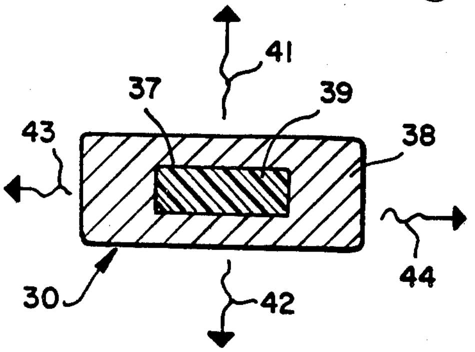
FIG.7
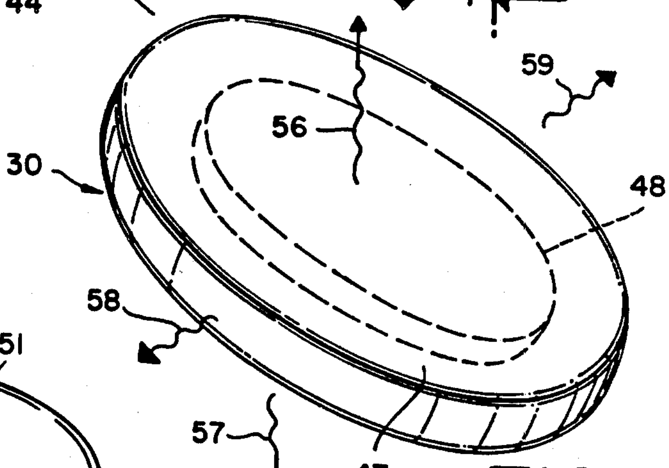
FIG.8
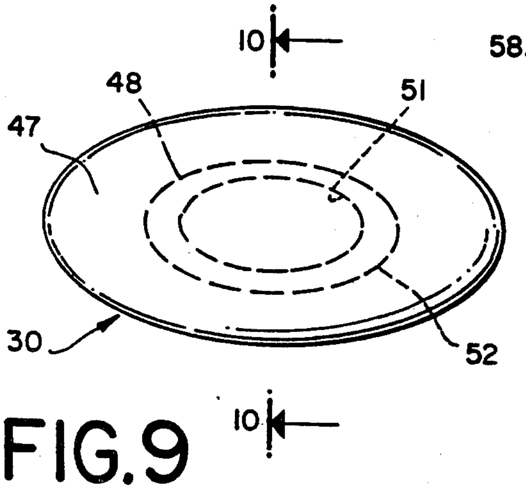
FIG.9
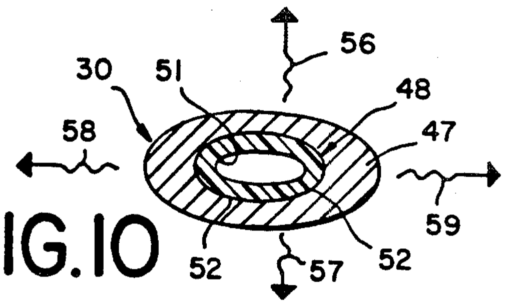
FIG.10

FIG. 11
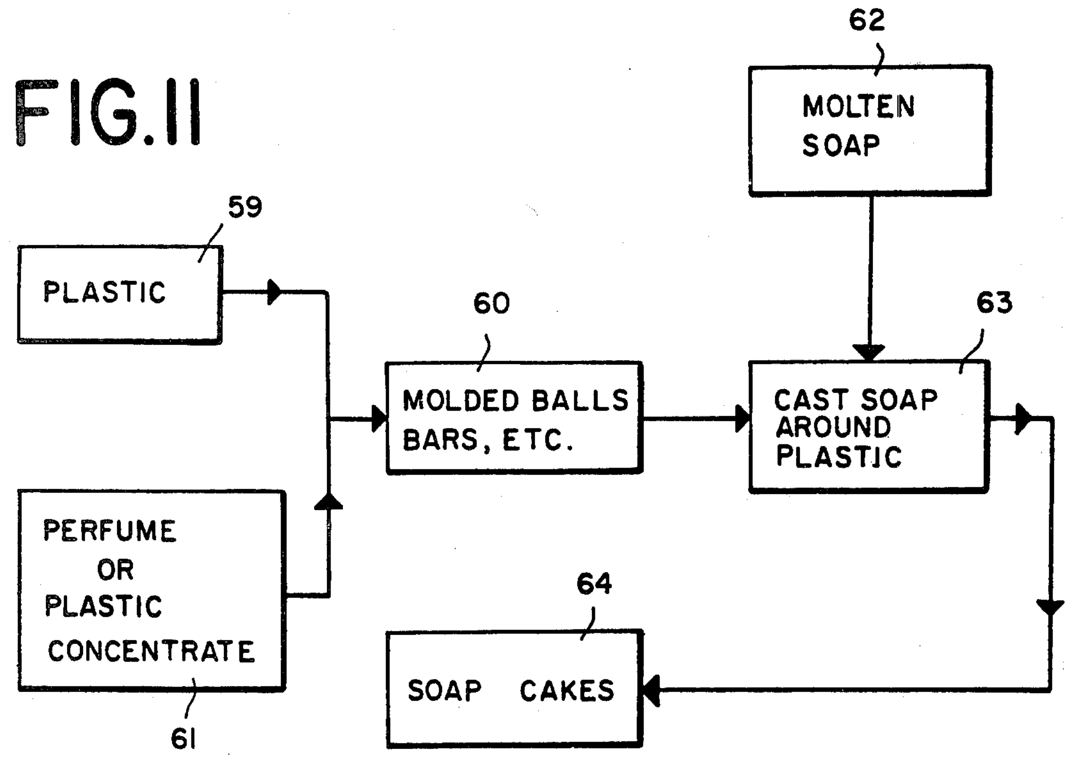
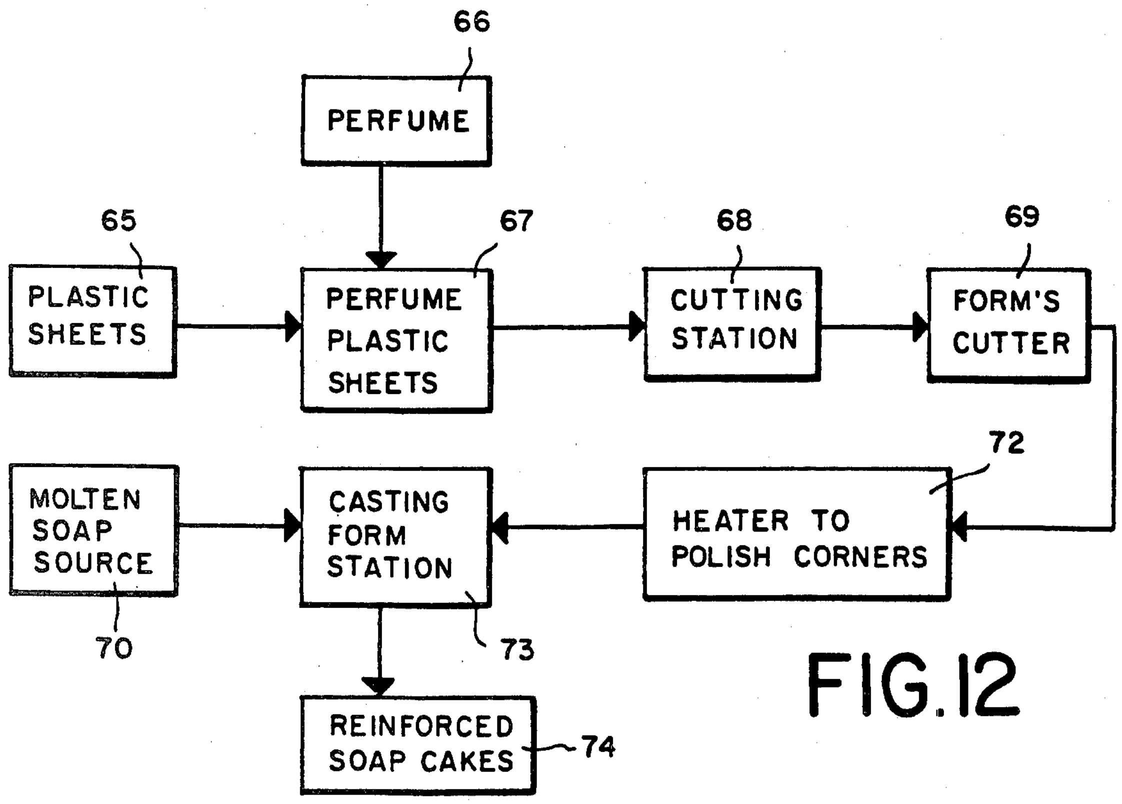
FIG. 12

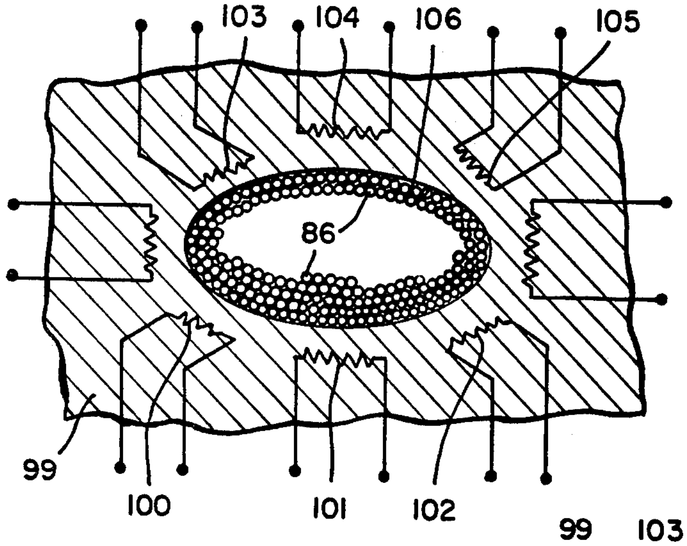
FIG.15
FIG.16
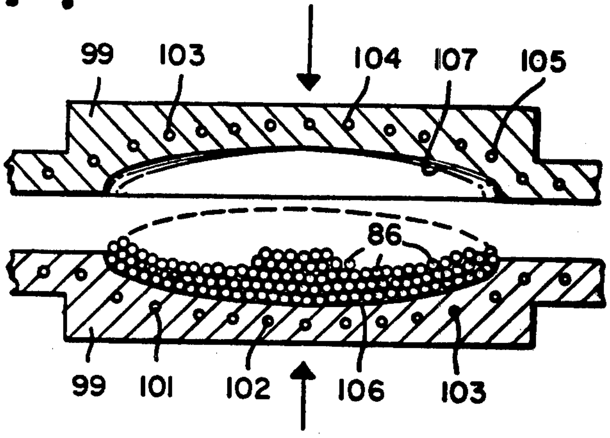
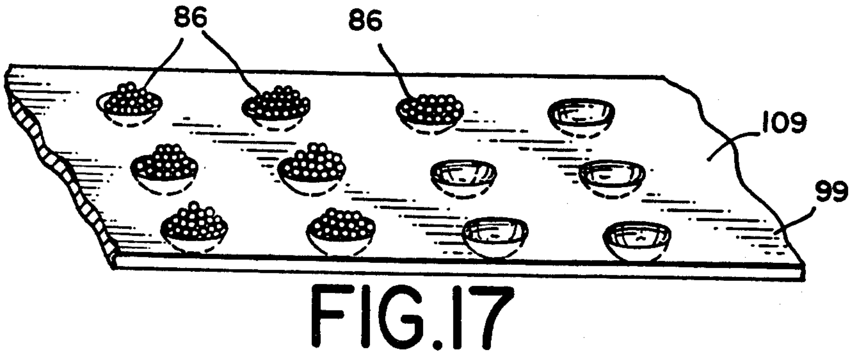
FIG.17
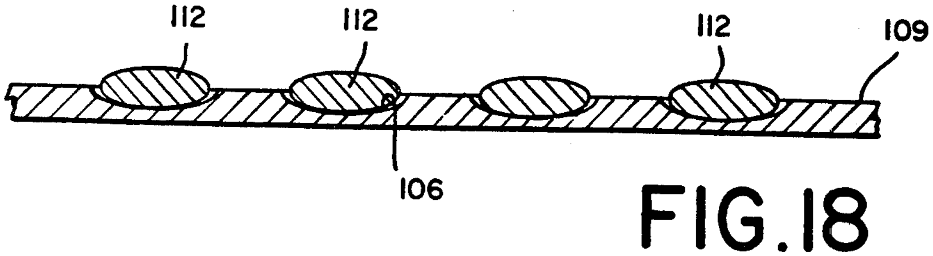
FIG.18

FIG.24
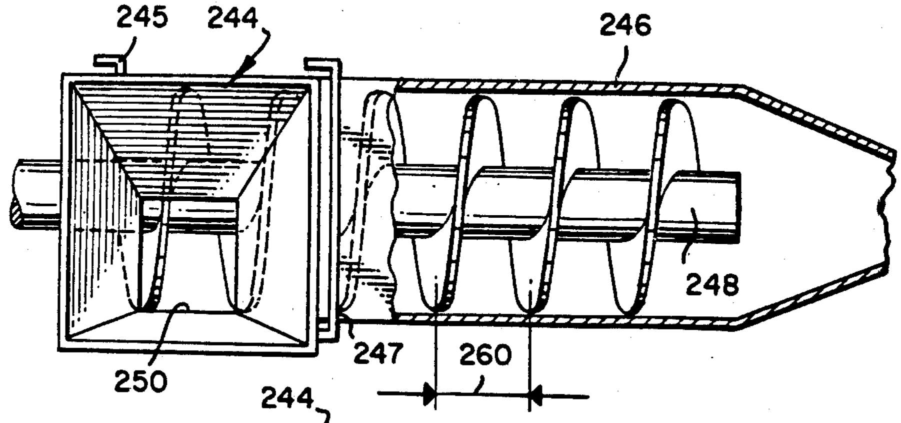
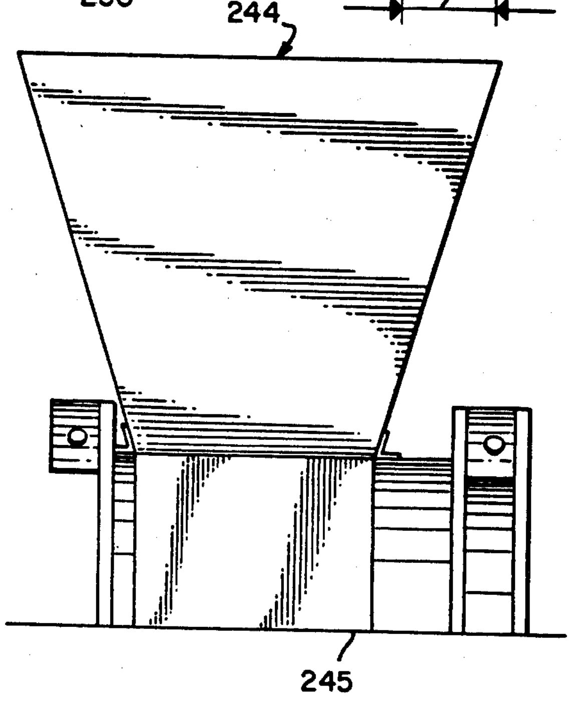
FIG.25
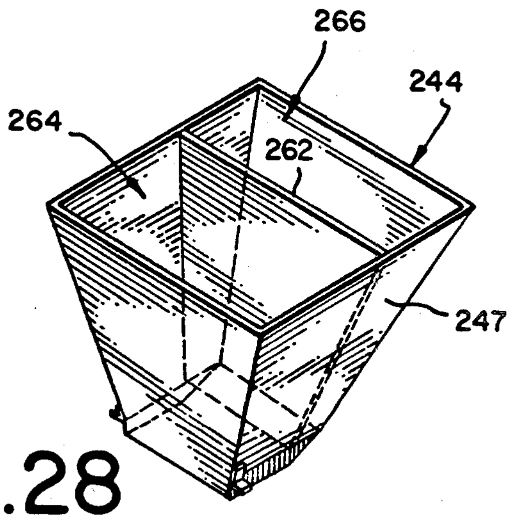
FIG.28

FIG.26
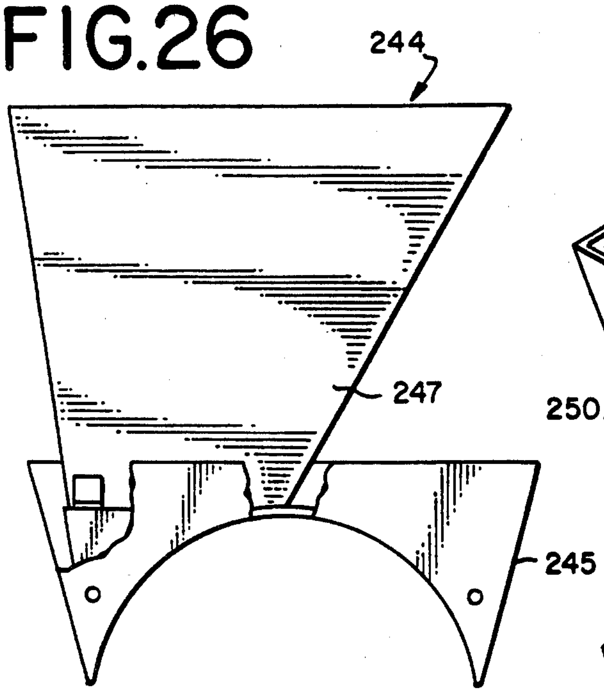
FIG.27
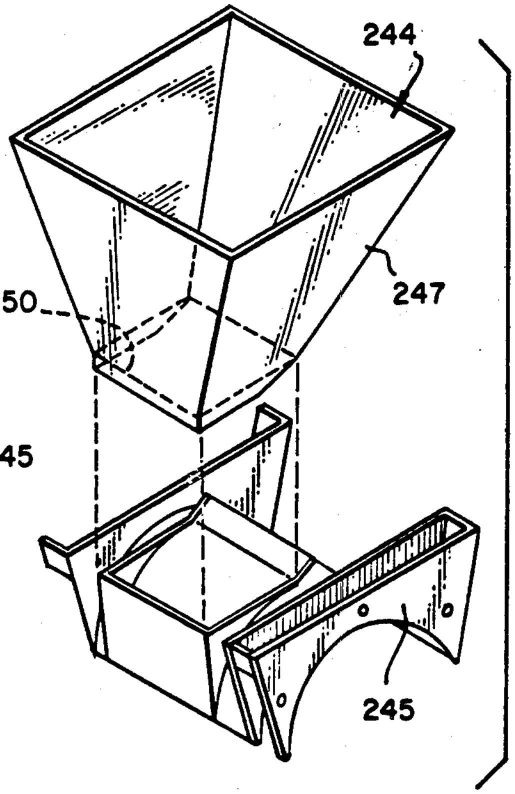
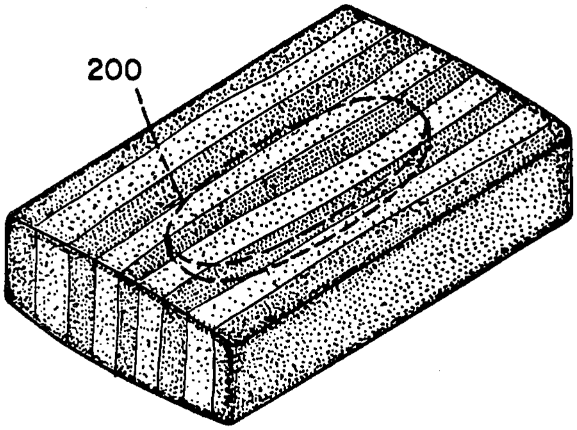
FIG.29
FIG.30
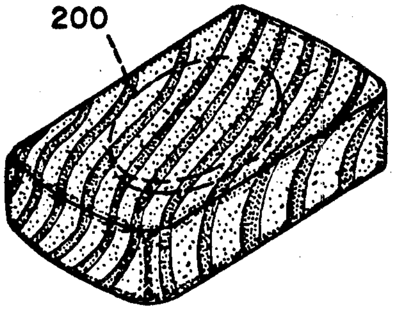

FIG.31
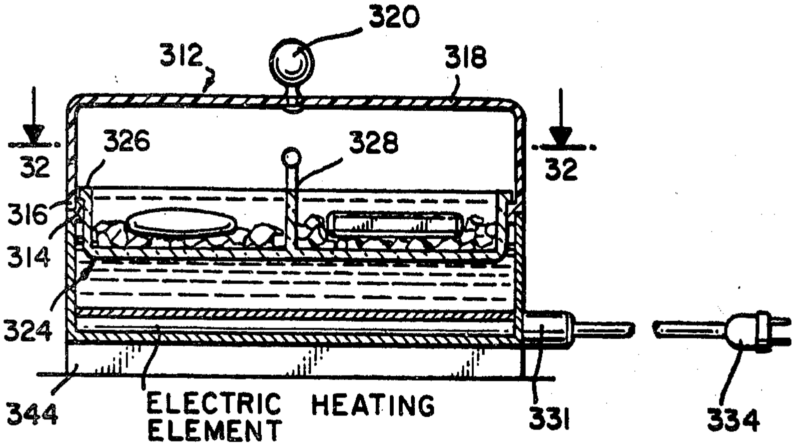
FIG.32
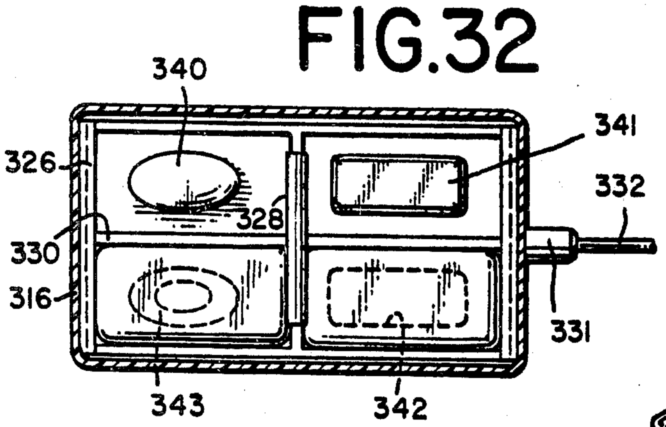
FIG.33
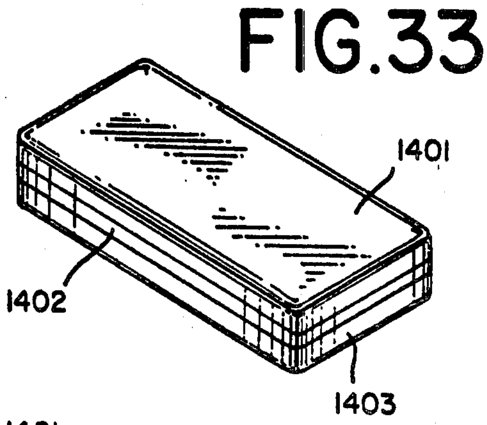
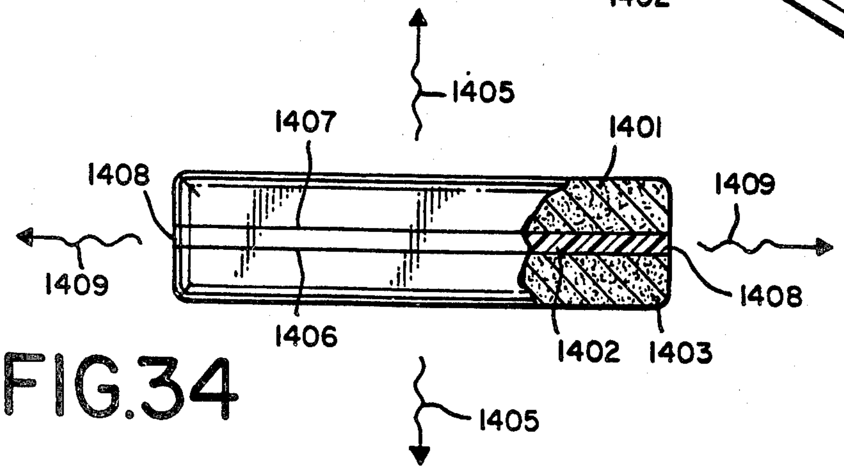
FIG.34

APPARATUS FOR MAKING SOAP WITH PERFUMED INSERT,

This is a divisional of application Ser. No. 362,263, filed Mar. 26, 1982 now U.S. Pat. No. 4,438,010.

BACKGROUND OF THE INVENTION

This invention relates to detergent bars having a perfumed plastic core. More particularly, it relates to detergent bars intended for conventional toilet soap uses either as hand soaps or bath or shower soaps which are elastic or inelastic in nature but which contain a solid perfumed plastic core giving them unique properties which alleviates wastage thereof and causes the aroma in the environment surrounding the soap, on use thereof, to be aromatized in an aesthetically pleasing manner.

A wide variety of materials have been incorporated into soap and synthetic detergent compositions. Soap bars have included perfumes, colorants, abrasives, bleaches, fillers, emollients and bodying agents and among the bodying agents, gelatin is one that has been utilized in the past. Soap bars have usually contained a lower polyhydric alcohol such as glycerol and additionally water, both of which are produced and utilized in the soap making process.

In U.S. Pat. No. 4,181,632 issued on Jan. 1, 1980, there is disclosed an elastic detergent bar useful as a functional article and bath plaything including a synthetic organic detergent which is either an anionic detergent or a amphoteric detergent, gelatin and water. It is further indicated in U.S. Pat. No. 4,181,632 that when the synthetic anionic detergent is employed, a cross-linking or denaturing agent for the gelatin is also present and the articles made in bar or cake form are useful detergents and substantially form-retaining. It is further indicated that although these articles wear away somewhat during their use, they retain their general shapes and elasticities for major proportions of their useful lives. In general, U.S. Pat. No. 4,181,632 defines a hand squeezable elastic solid molded detergent product comprising from about 10 to 80% of synthetic organic detergent selected from the group consisting of anionic, sulfated and sulfonated synthetic organic detergents and amphotetic synthetic organic detergents, said anionic, sulfated and sulfonated synthetic organic detergents being water soluble and selected from the group consisting of alkali metal, triethanolamine and ammonium linear higher alkyl benzene sulfonates, paraffin sulfonates, olefin sulfonates, higher fatty alcohol sulfates, monoglyceride sulfates and high fatty alcohol polyethylene glycol sulfates and mixtures thereof and the amphoteric detergent being water soluble and selected from the group consisting of betaaminopropionates, betaiminodipropionates and imidazolium salts and mixtures thereof, about 5 to 30% of gelatin, about 5 to 60% of water and about 1 to 5% of a compound selected from the group consisting of cross-linking agents and denaturing agents for the gelatin and mixtures thereof when the synthetic organic detergent is an anionic detergent which product is sufficiently squeezable and elastic so that a 2 cm thickness thereof can be pressed between a thumb and forefinger to a 1 cm thickness and upon release of such pressure, will return within 5 seconds to within 1 mm of the 2 cm thickness. U.S. Pat. No. 4,181,632, however, does not contemplate such a detergent bar containing a solid plastic core which is perfumed.

In Belgian design patent No. 877,711 there is disclosed a smooth egg-shaped core of hard plastic material which is molded in the center of a tablet of soap. It is further indicated that the soap from the composite tablet can then be used until the core is washed clean. It is further indicated that this obviates the wastage of soap which normally occurs as a conventional soap tablet becomes very thin. The said Belgian patent No. 877,711, however, does not indicate the utilization of a perfumed plastic core for such soap nor does it indicate the highly efficient process for producing same on the large scale as set forth herein.

In German Offenlegungsschrift No. 3,022,003, there is disclosed a bar of high quality or toilet soap of an appropriate form containing inside of it a two-part hollow capsule. The capsule may be spherical and/or may correspond to the external shape of the piece of soap itself. It is further disclosed in said German Offenlegungsschrift No. 3,022,003 that preferred materials for the capsule are soft plastics or duroplastics and the capsule itself may be externally coated with a soap material harder than that of the remainder of the bar. It is further disclosed in German Offenlegungsschrift No. 3,022,003 that the soap is intended especially for children, the internal capsule being easily taken apart after the soap has been consumed. It is indicated that inside the capsule, there may be an attractive figure or toy and it is thus an incentive for the child to use a bar of soap in order to reach the figure contained within it by contrast to the conventional idea where a bar of soap in the form of a figure rapidly loses that appearance as it is consumed.

In U.S. Pat. No. 4,297,228, there is disclosed a decorative soap comprising a soap with a synthetic resin layer formed on one side of the soap, a strippable layer having a printed layer expressing a pattern such as a design or letters and an adhesive layer which binds the synthetic resin layer to the strippable layer. Furthermore, it is disclosed in said U.S. Pat. No. 4,297,228 that another synthetic resin layer is further laminated on the strippable layer; preferably a layer of transparent soap is press-stuck on the strippable layer interposing a synthetic resin layer. The synthetic resin layer consists of a thin film formed by a thermoplastic resin such as acrylic resin, polyvinyl chloride resin, polypropylene or polyethylene. The strippable layer consists of cellulose resin or silicone resin. The film base material is a synthetic resin film which may be polyethylene, polyester terephthalate and prolypropylene.

U.S. Pat. No. 4,318,878 discloses a process for the production of a compound bar of soap, said bar comprising a primary piece of soap and at least one secondary piece of soap embedded therein, said process comprising:

(a) extruding said primary piece and each said secondary piece at an extrusion temperature of 35° to 45° C, (b) cooling each said secondary piece below said extrusion temperature to a cooled temperature of 25° to 35° C., (c) forming a cavity in the surface of said primary piece prior to said embedding adapted to receive at least one said secondary piece, (d) embedding each said secondary piece in a cavity, said primary piece having a viscosity low enough to permit flow during embedding, and said secondary piece having a viscosity high enough to substantially prevent flow during embedding.

In U.S. Pat. No. 2,360,920 there are disclosed soap buds made from an aerated aqueous solution of soap containing glycerine and a demulcent, such as may be made from a mixture of Irish moss and gelatin. U.S. Pat. No. 3,689,437 teaches the manufacture of maleable and nonhardenable detergent products from certain percentages of fatty acid isethionates, water, gelatin and hydrocarbon with a filler being optionally present. The resulting bars which may also contain glycerol or propylene glycol and other adjuvants are said to be moldable and extrudable but not elastic (apparently the elasticity is destroyed upon incorporation of the isethionate into the composition). U.K. Pat. No. 731,396 describes the manufacture of a shaped organic soapless detergent composition in which the organic soapless detergent such as triethanolamine alkyl benzene sulfonate is dispersed in the gelatin gel. Aeration of the gel to produce a frothy product is suggested as are the addition of various builders, fillers, nonionic detergents and the like.

Although the prior art has recognized that a plastic core can be incorporated into soap to prevent wastage and that an elastic soap bar may be produced and also that gelatin may be included in detergent compositions which may be desirably molded or shaped to bar or cake form, the teachings of the art as a whole do not result in bars satisfying applicants standards which require that the bars be form-retaining, sufficiently resistant to breakage and distortion during shipping, storage and use and have a continuous propensity to aromatize the environment surrounding the tablet on use as a result of the aromatizing agent being present in the internal plastic core.

OBJECTS OF THE INVENTION

It is an object of this invention to provide a detergent tablet having a minimum of wastage of the detergent on use thereof.

It is a further object of this invention to provide a detergent tablet having a propensity to create a steady state aromatization of the environment around which said detergent tablet is used.

It is a further object of this invention to provide a solid detergent tablet of uniform shape on use.

It is a further object of this invention to provide an elastic detergent bar having a solid perfumed plastic core which may be hollow or totally solid or which may contain one or more voids within said plastic core.

It is a further object of this invention to provide a detergent tablet which gives rise to a minimum probability of breakage on use thereof.

These and other objects of the invention will be set forth in more detail in the descriptions of the instant specification set forth infra.

BRIEF DESCRIPTION OF THE DRAWINGS

FIG. 1 is a perspective view of an ellipsoidally-shaped detergent tablet containing a solid plastic core which is aromatized.

FIG. 2 is the top view of the ellipsoidally-shaped detergent tablet of FIG. 1.

FIG. 3 is the cut-away front view of the ellipsoidally-shaped detergent tablet of FIG. 1 in the direction of the arrows in FIG. 2.

FIG. 4 is the side view of the ellipsoidally-shaped detergent tablet of FIG. 1.

FIG. 5 is a perspective view of a rectangular parallelepiped-shaped detergent tablet containing a rectangular parallelepiped-shaped plastic core which is aromatized.

FIG. 6 is a top view of the rectangular parallelepiped-shaped detergent tablet of FIG. 5.

FIG. 7 is the cut-away front view of the rectangular parallelepiped-shaped tablet of FIG. 5 looking in the direction of the arrows on FIG. 6.

FIG. 8 is a perspective view of an ellipsoidally-shaped detergent tablet containing a hollow aroma imparting agent-containing plastic core of our invention or, in the alternative, a hollow plastic core of our invention wherein the aroma imparting agent is in the solid plastic and not in the void of the plastic core.

FIG. 9 is a top view of the ellipsoidally-shaped detergent tablet of FIG. 8.

FIG. 10 is the front cut-away view of the ellipsoidally-shaped detergent tablet of FIG. 8 looking in the direction of the arrows on FIG. 9, the core thereof being hollow and either containing aroma-imparting liquid or, in the alternative, being a hollow core wherein the aroma-imparting material is in the solid portion of the core and wherein the void does not contain anything.

FIG. 11 is a flow chart of the process of our invention for forming soap cakes containing aromatized plastic cores.

FIG. 12 is another flow chart of the process of our invention for formulating reinforced soap cakes containing aromatized solid plastic cores or hollow plastic cores.

FIG. 15 is a fragmentary top plan view of a heated platen used in accordance with the apparatus of FIG. 13, showing the configuration of a dish-cup-like portion of the platen wherein the aromatized polymer pellets are compressed into plastic cores for incorporation into detergent tablets according to the present invention.

FIG. 16 is a fragmentary side elevational view with parts broken away and showing in section the heated platens of the apparatus of FIG. 13 during the compression step of the process of making the plastic cores for the soap tablets according to the present invention.

FIG. 17 is a perspective view of a heated platen part of the apparatus containing ellipsoidal voids containing therein polymeric aromatized pellets ready for compression.

FIG. 18 is a schematic view of the heated platen of FIG. 17 after the compression step for compressing the aromatized polymeric pellets into aromatized plastic cores.

FIG. 24 is a plan view, partly broken away, illustrating preferred apparatus used for preparing the variegated soap bars containing plastic cores of our invention, for feeding the plodder means including a hopper and a shroud for attaching the hopper and the plodder means.

FIG. 25 is a side elevational view of the hopper and shroud depicted in FIG. 24.

FIG. 26 is a front elevational view, partly in section, of the hopper and shroud depicted in FIG. 24.

FIG. 27 is an exploded perspective view of the hopper and shroud depicted in FIG. 24.

FIG. 28 is a perspective view of a hopper for an embodiment of the invention including divider means to form side by side channels into the plodder means.

FIG. 29 is a perspective view of a portion of a soap log made utilizing apparatus and process as illustrated in FIGS. 23, 24, 25, 26, 27 and 28 and illustrates a typical pattern of variegation at the surface of the log and at a cross section taken in the cross machine direction; and also illustrates by means of hidden lines, the presence of a plastic aromatizing core within the log.

FIG. 30 is a perspective view of a soap bar illustrating a pattern of variegation obtained utilizing apparatus and process within the scope of this invention.

FIG. 31 is a longitudinal vertical sectional view of the soap recycling container of the present invention including the aromatizing plastic core for inclusion with the recycled soap.

FIG. 32 is a longitudinal sectional view taken along 32—32 in the direction of the arrows of FIG. 31.

FIG. 33 is a perspective view of a rectangular parallelepiped-shaped detergent tablet containing a partially-exposed rectangular parallelepiped-shaped plastic core which is aromatized.

FIG. 34 is a side view of the rectangular parallelepiped shaped detergent tablet of FIG. 33.

DETAILED DESCRIPTION OF THE DRAWINGS AND DESCRIPTION OF PREFERRED EMBODIMENTS

Figure 13:
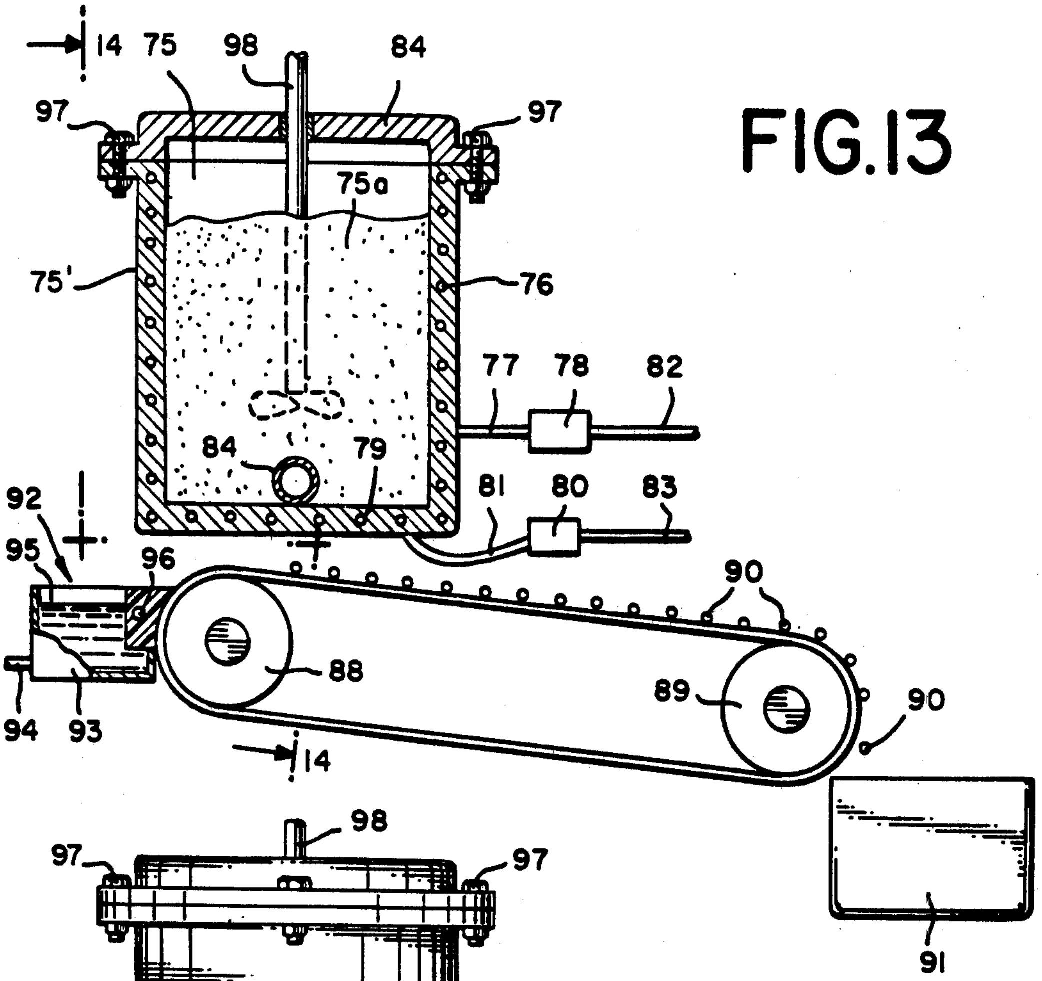
FIG. 13 is a partial side elevation and partial sectional view of an apparatus for forming scented polymer pellets usable in accordance with the process of our invention.

A preferred embodiment of the article of our invention comprises an ellipsoidally-shaped detergent tablet 30 containing a solid plastic core 32 which can be fabricated from, for example, polyethylene, polypropylene, nylon or any polymer capable of having therein microvoids from which aromatizing substance, e.g. a perfume material, will be controllably transported from the plastic core into and through the soap cake over a reasonable period of time during the use of the soap cake. Such polymers can be microporous polymers such as those described in U.S. Pat. No. 4,247,498 issued on Jan. 27, 1981, the specification for which is incorporated herein by reference. Surrounding the central plastic core containing perfume material, 32, is detergent 30′ which is in the solid phase at ambient conditions e.g. room temperature and atmospheric pressure. Examples of workable detergents 30′ are "elastic" detergents such as those described in U.S. Pat. No. 4,181,632 issued on Jan. 1, 1980, the disclosure of which is incorporated herein by reference, or "transparent" soaps such as those set forth in U.S. Pat. No. 4,165,293 issued on Aug. 21, 1979, the disclosure of which is incorporated herein by reference. Other examples of the detergent 30′ useful in our invention are those set forth as "variegated soaps" in Canadian Letters Patent No. 1101165 issued on May 19, 1981, the disclosure of which is incorporated by reference herein.

On use of the soap tablet 30 or detergent bar, the aromatizing agent originally located in plastic core 32 is transported at a steady state from core 32 through core surface 31 through the detergent 30′ and finally through the surface of the detergent bar at, for example, 33, 34, 35 and 36.

The detergent bar or tablet 30 of our invention may be of any geometric shape, for example, a rectangular parallelepiped tablet is shown in FIGS. 5, 6 and 7 containing solid plastic core 39. The aromatizing material located in solid plastic core 39 on use of the detergent bar passes through, at steady state, surface 37 of FIG. 6, detergent 38 and finally surface 39 at, for example, locations 40, 41, 42 and 43. The environment surrounding the detergent bar, on use thereof, is then aesthetically aromatized at 43, 44 and 45, for example.

As is shown in FIGS. 8, 9 and 10, the plastic core of the detergent tablet 30 may have a single finite void at its center 51 (of FIGS. 9 and 10) in which the aromatizing agent, is contained. The plastic core then is a shell 48 having outer surface 52 (shown in FIGS. 9 and 10). The aromatizing agent contained in the void in the plastic core permeates through shell 48, passed surface 52 at a steady state, through the detergent 47 and to the environment at, for example, 56, 57, 58 and 59.

In addition to the aromatizing agent contained in the core, e.g. core 39 or core void the core can also contain other materials for therapeutic use, for example, bacteriastats, deodorizing agents other than the aromatizing agent already contained in the core, insect repellants and the like.

In the alternative, the plastic core of the detergent tablet of FIGS. 8, 9 and 10 may have an empty single finite void at its center 51 with the aromatizing agent contained in the shell 48.

At the end of the use of the detergent tablet, the hollow core or the solid core can be used as an aroma-imparting or air freshener household article. In addition, depending upon the ratio of the volume of the void 51, the detergent tablet of FIGS. 8, 9 and 10 can be so fabricated that it will float on the surface of the liquid in which it is being used and this physical attribute has certain obvious advantages.

FIGS. 11 and 12 set forth in block diagram form process flow sheets for preparing the detergent tablets within which are contained the plastic cores.

Thus, in FIG. 11, a perfume or "concentrate of perfume in polymer" 61 is combined with additional polymer 59 and the resulting mixture is molded into bars, ellipsoids, rectangular parallelepipeds or spheres at 60. Soap is then cast around these molded polymer spheres, ellipsoids or rectantular parallelepipeds at 63 from a source of molten soap 62. The resultant castings are then cooled in order to form soap cakes in the solid phase at ambient conditions at 64.

In the alternative, polymer sheets 65 are imbedded with aromatizing agent from source 66 to form aromatized plastic sheets at 67. These aromatized plastic sheets are then cut at the cutting station 68 to form cut forms at 69 which are then heated to such a temperature whereby the angular sharp corners are "polished" at 72. Soap from molten soap source 70 is then cast around the resultant plastic forms at casting station 73 and the resultant material is then cooled thereby formino reinforced aromatized soap cakes at 74.

Figure 14:
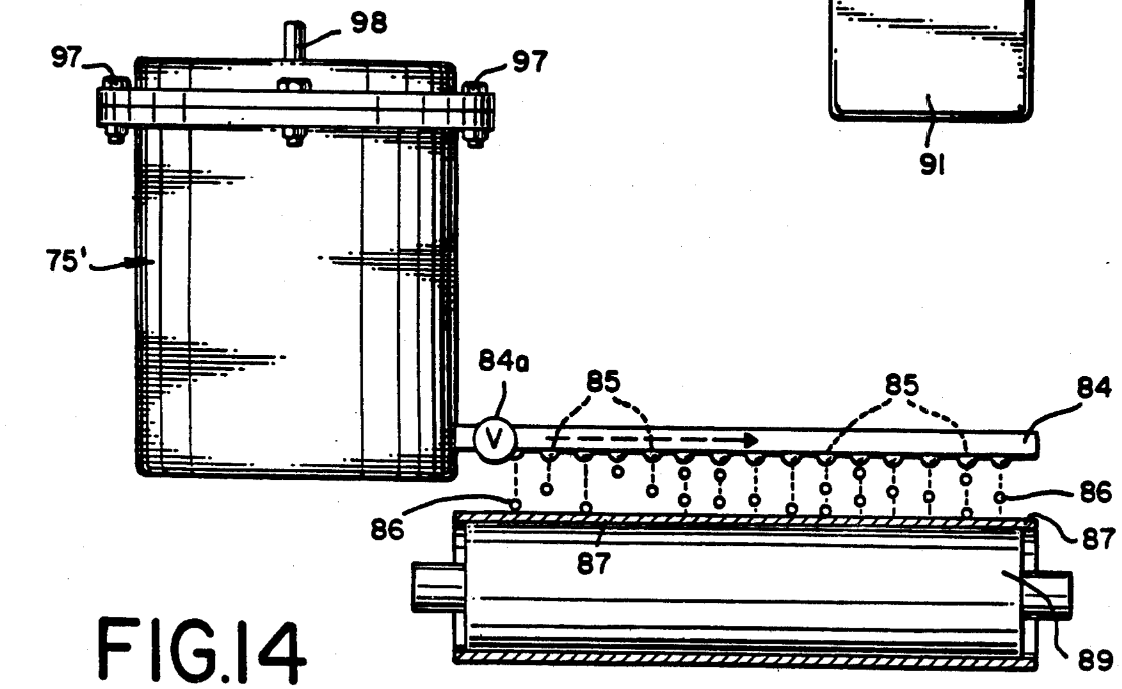
FIG. 14 is a section taken on line 14-14 of FIG. 13.

In FIGS. 13 and 14 there is provided a process for forming scented polyolefin elements such as pellets useful in the formation of the plastic core useful in fabricating the soap tablet or detergent tablet of our invention, which comprises heating the polyolefin with a material having a selected scent or aroma at a temperature in which the polyolefin remains liquid such as a temperature range of 250°-300° F. If polyethylene is used as the polyolefin, it is preferably one that has a melting point in the range of 200°-280° F. and is preferably odorless and colorless. The viscosity of the polyethylene is preferably in the range of 180-200 sayboldt seconds. The operating temperature is maintained in the container preferably by electric thermostatic elements which permit a controlled temperature in the range of 250°-300° F. The lowermost portion of the container is maintained at a slightly lower temperature and the material of the container is taken off at such location for delivery through the conduit and discharge by dripping through the orifices in such conduit.

Thus, referring to FIGS. 13 and 14 in particular, the apparatus used in producing such elements comprises a device for forming scented polyolefin pellets which comprises a vat or container 75 into which a mixture of polyolefins such as polyethylene and an aromatic substance or scented material is placed. The container is closed by an air-tight lid 84 clamped to the container by bolts 97. A stirrer 98 traverses the lid or cover 84 in air-tight manner and is rotated in suitable manner. A surrounding cylinder 75' having heated coils which are supplied with electric current through cable 77 from a rheostat or control 78 is operated to maintain the temperature inside the container 75 such that polyethylene in the container will be maintained in the molten or liquid state. It has been found advantageous to employ a colorless, odorless polyethylene with a viscosity ranging between 180 and 220 sayboldt seconds and having a melting point in the range of 200°-280° F. The heater 76 is operated to maintain the upper portion of the container 75 within a temperature range of from 250°-350° F. The bottom portion of the container 75 is heated by means of heating coils 79 regulated through a control 80 connected thereto through a connecting wire 81 to maintain the lower portion of the container 75 within a temperature range of from 250°-350° F.

Thus, polyolefin added to the container 75 is heated from 10-12 hours whereafter a scent or aroma imparting material is quickly added to the melt. The material must be compatible with the polyolefin and forms a homogeneous liquid melt therewith. The scented material is of a type for the particular aroma desired and formulated specifically for the scenting purpose for which the polyolefin will be employed. The heat resisting oils and aromatic materials in some instance in solid or powdered form may be employed and added to the polyolefin in the container 75. Generally about 10-30% by weight of scenting material are added to the polyolefin.

After the scent imparting material is added to the container 75, the mixture is stirred for a few minutes, for example, 5-15 minutes, and maintained within the temperature ranges indicated previously by the heating coils 76 and 79, respectively. The controls 78 and 80 are connected through cables 82 and 83 to a suitable supply of electric current for supplying the power for heating purposes.

Thereafter, the valve 84a is opened permitting the mass to flow outward through conduit 84 having a multiplicity of orifices 85 adjacent to the lower side thereof. The outer end of the conduit 84 is closed so that the liquid polyolefin and aroma mixture will continuously drop through the orifices 85 downwardly from the conduit 84. During this time the temperature of the polyolefin and aroma mixture in the container 75 is accurately controlled so that a temperature in the range of from about 210°-275° F. will exit in the conduit 84. The regulation of the temperature through the control 78 and the control 80 is essential in order to insure temperature balance to provide for the continuous dropping or dripping of molten polyolefin and scenting mixture through the orifices 85 at a range which will insure the formation of droplets 86 which will fall downwardly onto a moving conveyor belt 87 trained to run between conveyor wheels 88 and 89 beneath the conduit 84.

When the droplets 86 fall onto the conveyor 87, they form pellets 90 which harden almost instantaneously and fall off the end of the conveyor 87 into a container 91 which is advantageously filled with water or some other suitable cooling liquid to insure the rapid cooling of each of the pellets. The pellets 90 are then collected from the container 91 and utilized in a process as illustrated infra.

A feature of this aspect of the process of our invention is the provision for moistening the conveyor belt 87 to insure rapid formation of the solid polyolefin scented pellets 90 without sticking to the belt. The belt 87 is advantageously of a material which will not normally stick to a melted plastic, but the moistening means 92 insures a sufficiently cold temperature of the belt surface for the adequate formation of the pellets 90. The moistening means comprises a container 93 which is continuously fed with water 94 to maintain a level 95 for moistening a sponge element 96 which bears against the exterior surface of the belt 87.

As will be seen in FIG. 15, the pellets 86 are then placed, for example, into cup-like portions of platens 99 heated with heating element 100, 101, 102, 103, 104 and 105 which convey heat to surfaces 106. The platens 99 are moved together after the pellets 86 are placed therein squeezing them together and heating them so that they fuse into the plastic cores suitable for the production of the soap or detergent tablets of our invention. The number of pellets 86 placed onto surfaces 106 and the pressure exerted by platens 99 causes the flow of plastic between pellets 86 whereby the scenting or aromatizing material does not escape substantially from the pellets during the processing into the core. This requires a high pressure of 100-5,000 atmospheres and the maintenance of a relatively low temperature for fusing; betweeen 40° F. and 80° F., for example, in the case of polyolefins.

It is to be understood that the polyolefins useful in our invention may be replaced by any other polymers capable of interconnected micropores which contain aromatizing or scenting material such as all of those disclosed in U.S. Pat. No. 4,247,498 issued on Jan. 27, 1981, the disclosure of which is incorporated by reference herein. Thus, the fused cores 112 after compression of the pellets 86 so that they flow together at surfaces 107 are releasable from the platens at 109 and usable in the processes set forth infra. It is convenient to incorporate in the polymer solution forming pellets 86 a small amount of a mold releasing agent well known to be useful in such processes.

Figure 19:
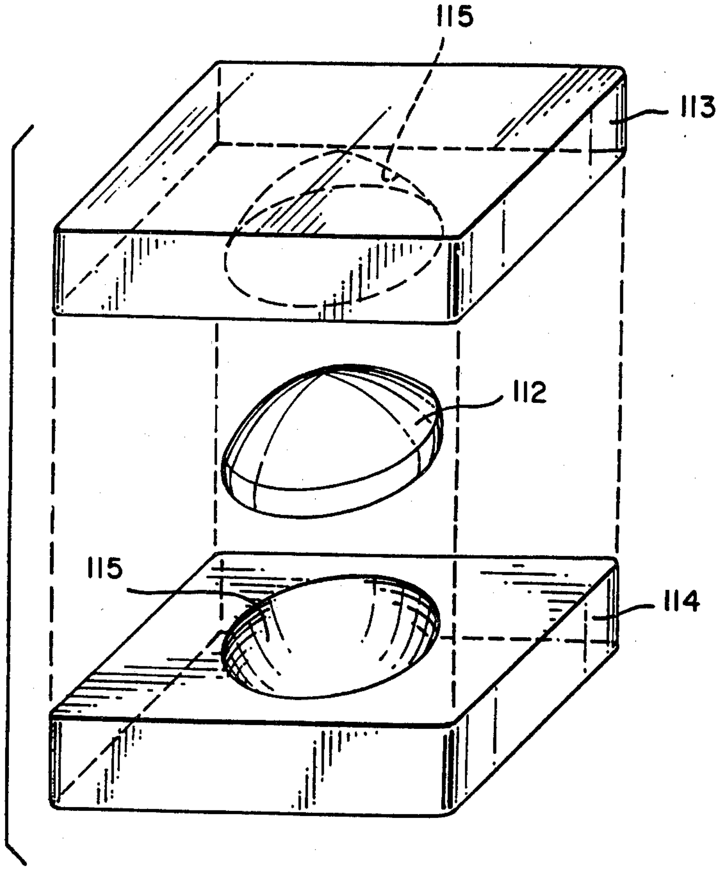
FIG. 19 is a perspective view of a technique for inclusion of an aromatized plastic core into a detergent tablet using an upper detergent tablet section and a lower detergent tablet section.

The thus fused core 112 as is shown in FIG. 19, may then be incorporated between two tablet portions of soap or detergent 113 and 114, the upper tablet being 113 and the lower tablet being 114. Voids 115 are provided in upper tablet 113 and lower tablet 114 whereby when they are placed onto core 112 simultaneously and whereby when they are fused together by means of application of an exterior source of heat, the core 112 will conveniently fit snugly between the upper tablet 113 and the lower tablet 114.

Figure 20:
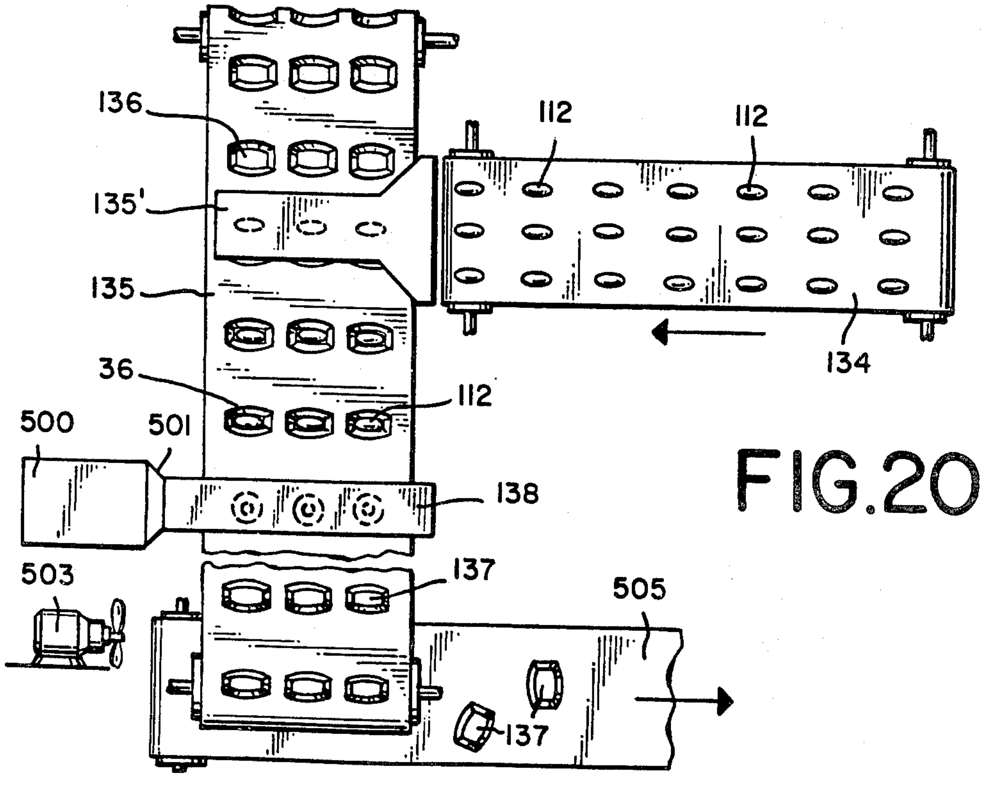
FIG. 20 is a top plan view of an alternative embodiment of the apparatus for preparing molded detergent tablets around aromatized plastic cores of our invention in operation.

In the alternative, the cores 112 as is illustrated by FIG. 20, may be passed on conveyor belt 134 into cups 136 on conveyor belt 135 through a distributing hopper 135'. Cups 136 are then filled from filler 138 with molten soap maintained at a fluid temperature by heater 500 at location 501. Then the cores now located in the molten soap 137 are cooled using cold air or other cooling means 503. The thus-formed solid tablets are dropped onto conveyor belts 505 and sent to an appropriate packaging operation.

Figure 21:
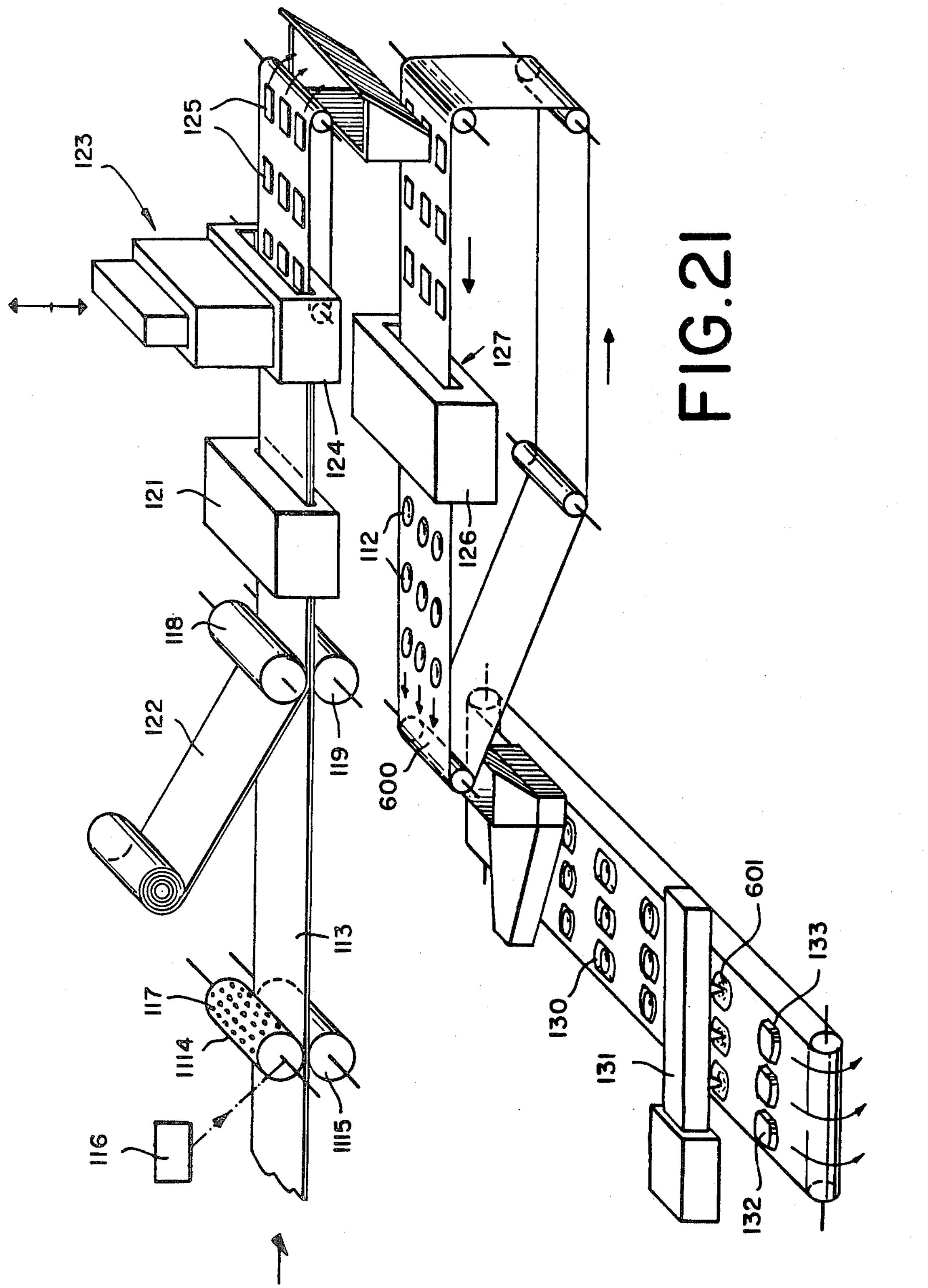
FIG. 21 is a perspective view of another embodiment of the apparatus of our invention showing the formation of the aromatized plastic cores and formation of molded soap around said plastic cores.
Figure 22:
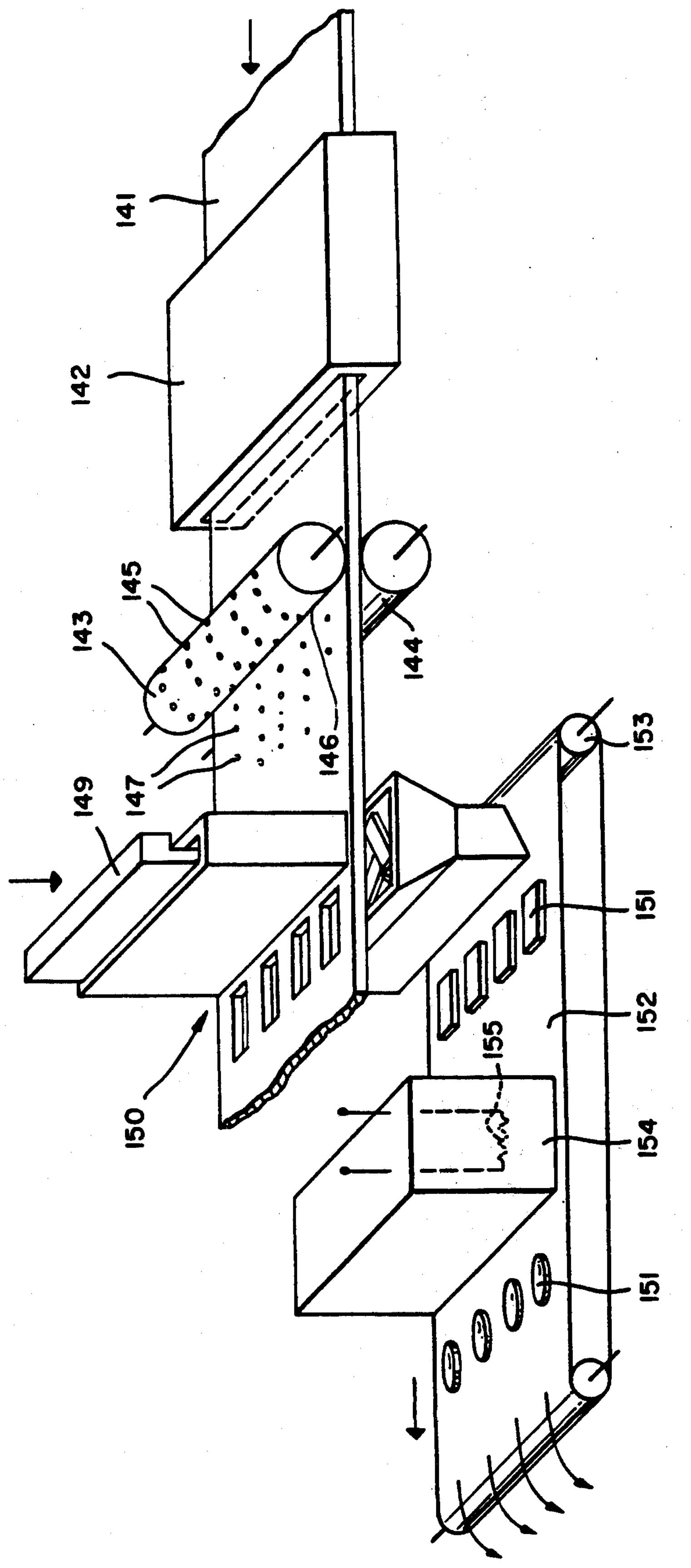
FIG. 22 is a perspective view of another embodiment of our invention for formation of the aromatized plastic cores of our invention usable in forming the articles of our invention.

FIGS. 21 and 22 show in perspective, other methods for forming cores 112. Thus, in FIG. 21 two flexible plastic sheets having thickness between 1 cm and 2 cm each and widths of between 3 cm and 50 cm are fed through rollers 118 and 119 after perfuming either one or both sheets using rollers 1114 and 1115, for example. The perfume is fed onto the plastic sheets each of which or one of which has interconnected micropores through orifices 117 in the rollers 1114 and 1115. Thus, solutions at 116 under high pressure are fed through the orifices 117 onto plastic sheets 113 and 122 and into the plastic sheets through the interconnected micropores therein. The solutions of perfume may be solutions in liquid ammonia or more preferably liquid carbon dioxide at temperatures whereby the structure of the plastic sheets 113 and 122 will not be physically impaired. The thus-aromatized sheet or sheets 113 and 122 are passed through rollers 118 and 119 where they are fused together using heating elements 121. Subsequent to fusing, the thus formed sheet is cut using cutter 123 at location 124. The cut fused sheets are now in strips 125 which are heated at 127 by heating source 126 in order to eliminate any sharp edges thereby forming cores 112. Cores 112 are then passed on conveyor belt 600 into cup 130 which is simultaneously filled from filler 131 with molten detergent 601 at such a rate and at such a temperature and having such a viscosity and density that the core 112 is caused to be retained at a location concentrically within the molten soap 132. The thus formed core-detergent article is cooled so that the detergent surrounding the core solidifies and in such a state it is released from the cup 133.

By the same token, a single plastic sheet 141 as is shown in FIG. 22 may be first heated by heating means 142 and then passed through rollers 143 and 144 which are hollow and which have orifices 145 at location 146. Perfuming or aromatizing material is passed through the orifices 145 under pressure at location 146 into interconnected micropores 147. The sheet is cut at 150 using cutting means 149 and is then passed onto conveyor belt 152 operated by roller 153. The resulting cut perfumed plastic 151 is heated to remove any sharp corners at location 154 by heating means 155.

FIGS. 23–30 set forth an apparatus for carrying out a further embodiment of the process of our invention for making aromatized core-containing soap tablets or detergent tablets of our invention.

Figure 23:
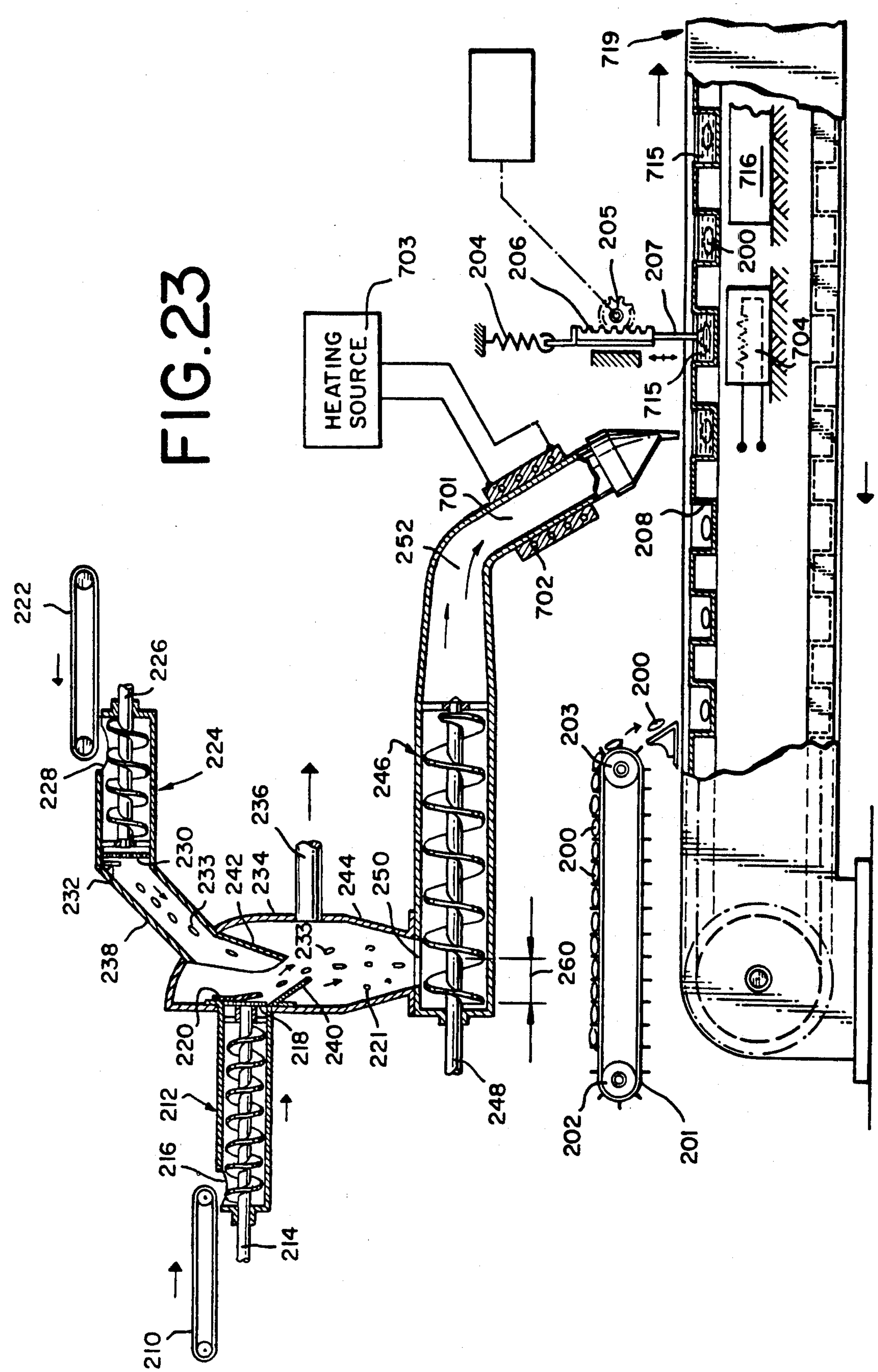
FIG. 23 schematically illustrates preferred apparatus and process within the scope of our invention for the production of variegated soap bars which include an aromatized plastic core.

Referring to FIG. 23 of the drawings, a feed conveyor 210 denoted a rate control adjuster, acts in combination with a preplodder 212 to form soap noodles of one color.

The preplodder 212 has an inlet 216 at one end and an outlet at the other end. It is equipped with a worm 214 adapted to rotate in a clockwise direction (looking in the direction of the outlet end). It has a perforated plate 218 equipped with knife edge 220 at its outlet end. The knife edge 220 is adapted to rotate adjacent the outer surface of the plate 218. The feed conveyor 210 is adapted to feed a soap mass into the inlet 216.

A feed conveyor 222, denoted a rate control adjuster, acts in combination with a preplodder 224 to form soap noodles of a second color.

The preplodder 224 has an inlet 228 at one end and an outlet at the other end. It is equipped with a worm 226 adapted to rotate in a counter-clockwise direction (looking in the direction of the outlet end). It has a preperforated plate 230 equipped with a knife edge 232 at its outlet end. The knife edge 232 is adapted to rotate adjacent the outer surface of the plate 230. The feed conveyor 222 is adapted to feed a soap mass into inlet 228.

The outlet end of the preplodder 212 communicates with a main feed conduit 234 which is known in the art as a vacuum chamber. The conduit 234 communicates with a conduit 236 for drawing a vacuum on conduit 234.

A conduit 238 provides communication between the outlet of preplodder 224 and main conduit 234.

A chute 240 is mounted and positioned within conduit 234 to receive noodles from preplodder 212 and guide them centrally of the conduit 234.

A chute 242 is mounted and positioned within conduit 234 to receive noodles from conduit 238 (which, in turn, receives noodles from preplodder 224) and guide them centrally of conduit 234.

The chutes coact to form a common stream of noodles as hereinafter described.

A hopper 244 communicates with main conduit 234 and functions to receive the noodles from chutes 240 and 242.

A final plodder 246 communicates with hopper 244 to receive noodles therefrom. It has an inlet at one end which communicates with an outlet 250 of the hopper 244. (The inlet into the plodder 246 and the outlet from hopper 244 are essentially coextensive.) It has an outlet 252 at the other end communicating with conduit 701 which is heated using heating coils 702 supplied from heating source 703 whereby the resultant stream is fed into voids 208. The final plodder 246 is equipped with a worm 248 adapted to rotate in a clockwise direction (looking in the direction of the outlet end). Simultaneously with the feeding of the combined molten detergent into 208, conveyor belt 201 operated by rollers 202 and 203 having located thereon cores 200 is operated whereby cores 200 are fed into the molds 208 containing the molten soap fed from conduit 701. Heater 704 provides the soap in a molten state and, if necessary, microplunger 207 operated by gear 206 through cam 205 and biased spring 204 maintains the core 200 within the soap in 208. The soap and core article 200 and 715 are then cooled using cooling means 716 whereupon the combination core and soap article is then sent on to a packaging source 719.

In FIG. 24, there is depicted the outlet 250 of the hopper 244 and its relative size and positioning with respect to the final plodder 246 which is an important feature of this aspect of the apparatus of our invention. As is indicated in FIG. 24, the outlet 250 of the hopper 244 provides communication essentially only with a portion of the worm 248 of the final plodder means 246 which turns downwardly on rotation of such worm.

In a more detailed description of preferred apparatus for containing aromatized core containing variegated soap bars of our invention, the preplodders 212 and 224 typically have worm diameters ranging from about 6" to about 16" as set forth on page 8 of Canadian Patent No. 1101165 issued on May 19, 1981, the disclosure of which is incorporated by reference herein. The plates 218 and 230 can have perforations (holes) with diameters ranging from about 1/32" to about 1" preferably from about 1/16" to about ¾" and optimally from about ⅛" to about ½". Such perforations typically have lengths from about 1/16" to about 1". The plates 218 and 230 are each normally provided with from about 10 to about 2,500 perforations (about 5% to about 50% open area in each plate). Normally each of the holes in each plate has about the same diameter. Although circular holes are preferred, other shaped holes can be employed, for example, rectangular, oblong or star shaped holes. In the case of non-circular holes, the ranges given for diameters refer instead to the largest cross-sectional dimension.

In FIGS. 24, 25, 26, 27 and 28, the hopper 244 is depicted as including a shroud 245 which functions to attach the hopper 244 to the final plodder 246. The hopper is oriented so that hopper wall 247 is the front wall (see FIGS. 24, 26 and 27).

The shroud 245 in the depicted apparatus also serves the function of surrounding a portion of the worm of the plodder 246; this function is carried out because the plodder 246 is depicted as conventional ordinarily having an inlet which is too large for the practice of the present invention. The shroud can be eliminated if a final plodder 246 is manufactured for use in this invention so as to have an inlet opening positioned and of a size to accommodate this invention. In such case, the hopper can be attached at the inlet of the final plodder, for example, by wedging or welding or the like.

It is very important herein that the opening of outlet 250 for feeding into the final plodder 246 can be designed to communicate essentially only with a portion of the worm of the plodder which turns downwardly on rotation of such worm. Thus, the opening should have a dimension in the cross machine direction in respect to the plodder of no more than about 1.1 times the radial direction of the worm. Generally, this opening should have a dimension in the cross machine direction in respect to the plodder means of at least about ½ the radial dimension of the worm. The lower limit is selected to provide a sufficient amount of feed area so as to minimize the danger of clogging in the restricted opening of outlet 250 entering conduit 701. The upper limit is selected to obtain the advantageous results described above. The opening typically has a dimension in the machine direction in respect to the plodder means ranging from about ½ the flight distance to about twice the flight distance (the term "flight distance" is used herein to mean the distance between successive corresponding points on the blade (or thread) of the worm, in other words, the dimension 260 is shown in FIGS. 23 and 24). Preferably the opening is in the form of a right parallelogram and more preferably in the form of a rectangle. Most preferably the hopper outlet into the plodder is positioned and dimensioned so as to provide a feed stream into the plodder having a horizontal cross section which is rectangular and has a dimension in the feed direction of the plodder of 1 times the flight distance and a dimension in the cross machine direction of the plodder equal to the radial dimension of the worm.

Typically, the plodder 246 has a worm diameter ranging from about 14" to about 16.5", a flight distance on the worm ranging from about 6" to about 12" and a barrel length ranging from about 4 feet to about 6 feet.

In a different apparatus within the scope of the apparatus useful in our invention as depicted in FIG. 28, the hopper 244 includes a divider member 262 which extends in a longitudinal direction (that is in the same direction as the machine direction of final plodder 246; in this regard note the orientation of divider 262 with respect to the front hopper wall 247) to form side by side channels 264 and 266 into plodder means 246 with channel 264 functioning to receive noodles from one of the preplodders and channel 266 functions to receive noodles from the other of the preplodders. Preferably, the channels are dimensioned so that the ratio obtain by dividing the horizontal cross sectional area of channel 264 by the horizontal cross sectional area of channel 266 is equal to the ratio obtained by dividing the feed rate at to (and from) channel 264 by the feed rate to (and from) channel 266. For this embodiment the chutes 240 and 242 as depicted in FIG. 23 are designed and positioned so that the noodles of the different colors will remain segregated and so that the noodles of only one particular color will be fed into one particular channel.

In carrying out this aspect of our invention for producing the variegated detergent tablet having an aromatized core, a first color soap mass is conveyed by a rate control adjuster 210 into the inlet 216 of preplodder 212. Worm 214 is rotated and acts to compact such soap mass and extrudes it through the holes in plate 218. The soap mass exits from the holes in plate 218, for example, in the form of cylinders. These cylinders are cut into noodles, for example, by rotation of knife edge 220. Typical noodles produced as a result of such processing are indicated by reference numeral 221 in FIG. 23.

A soap mass of a second color is conveyed by rate control adjuster 222 into the inlet 228 of preplodder 224. Worm 226 is rotated and acts to compact such soap mass and extrudes it through the holes in plate 230. The soap mass exits from the holes in plate 230, for example, in the form of cylinders. These cylinders are cut into noodles, for example, by rotation of knife edge 232. Typical noodles produced as a result of such processing are indicated by reference numeral 233 in FIG. 23.

The soap masses for processing in each of the preplodders 212 and 224 can be in the form of pellets, billets, flakes, chips, filaments, chunks, shavings or other suitable preplodding form. Preferably, one of the soap masses is white in color and the other either blue or green.

The soap masses entering the preplodders 212 and 224 normally have a temperature ranging from about 75° F. to about 105° F. The temperature of the soap mass in a preplodder is typically maintained at within the same temperature range; however, temperatures have risen within the preplodders to 115° F. or higher without deleterious result. The temperatures within a preplodder are controlled by circulating suitable coolant, for example, brine, through the preplodder barrel. Preferably the temperature differential between the soap masses in the two preplodders is 10° F. or less; however, processing has been carried out at temperature differentials of 15° F. and higher without deleterious result.

The noodles produced as a result of cutting by knife edges 220 and 232, that is, the noodles produced by each preplodder, perforated plate, cutting knife assembly, typically are in the form of cylinders and have diameters ranging from about 1/32" to about 1" preferably from about 1/16" to about ¾" and optimally from about ⅛" to about ½". When the noodles are in forms other than cylindrical, for example, with cross sections that are rectangular or oblong or star shaped, the largest cross sectional dimension should fall within the range of values given above for diameters. Typically, the noodles have lengths ranging from about ¼" to about 2.5" with lengths ranging from about ½" to about 2" being preferred. The noodles of the different colors can be of the same size or of different sizes and no particular size or ratio of size is important or critical within the framework of this invention.

Typically the preplodders are fed and utilized to produce noodles so that the weight ratio of noodles of one of the colors to noodles of the other of the colors does not exceed about 10:1; this is because at weight ratios in the range of 10:1 to 20:1, variegation effect diminishes and is eventually lost.

The noodles 221 enter main conduit 234 and are guided by chute 240 and the noodles 233 enter main conduit 234 and are guided by chute 242 to mingle the noodles and form a common stream in main conduit 234 with the noodles in that stream consisting of noodles of one color intermingled with noodles of the second color.

The main conduit 234 is typically described as a vacuum chamber and means 236 is provided to draw a vacuum on that chamber if desired. Vacuum is desirable to produce compositions which are the least subject to dry cracking after admixing the ultimately formed variegated soap composition with the cores 112. However, vacuum need not be used. When vacuum is used, the amount of vacuum usually ranges from about 25 inches of mercury to about 29 inches of mercury (that is, absolute pressure ranges from about 5 inches of mercury to about 1 inch of mercury).

The noodles in the common stream fall as a result of gravity into hopper 244 where a bed of noodles (intermingled with respect to color) builds up. This bed ordinarily has a vertical dimension ranging from about 2" to about 20", preferably from about 6" to about 12".

From such bed, the noodles are choke fed through the restricted opening of outlet 250 of hopper 244 into final plodder 246. The constraining apparatus in the form of the restricted opening has the effect of restricting lateral and longitudinal motion in the bed thereby contributing to the consistent variegation results and other benefits as aforestated In final plodder 246, the noodles are compacted and extruded to form a variegated soap log 253. The temperature of the soap log 253 extruded from plodder 246 is preferably in the range of from about 85° F. to about 105° F. by means of a cooling jacket adjacent to the plodder outlet through which brine or other cooling agent is circulated. While temperatures between 85° F. and 105° F. are preferred, temperatures have risen to 115° F. or higher without deleterious results. Rates through plodder 246 typically range from 40 to 90 pounds per minute with 60 to 75 pounds per minute being preferred. In usual operation, the soap log extrudes from the nozzle of the plodder at pressures ranging from about 100 to about 350 pounds per square inch, preferably ranging from about 150 to about 250 pounds per square inch.

The log 253 emanating from outlet 252 of plodder 246 is then heated into a flowable mass for combination with cores 112 as stated supra.

In carrying out the processing for making variegated soap bars containing an aromatizing plastic core in conjunction with FIG. 28, the processing conditions are the same as those described above except that the noodles produced by the two noodle producing assemblies (each comprising a preplodder, a perforated plate and a rotatable knife edge) are not intermingled. Instead the noodles are produced by the assembly including preplodder 212 are guided by a chute (not depicted) to form a stream entering channel 264 and the noodles formed by the assembly including preplodder 224 are guided by a chute (not depicted) into channel 266 (in other words, to form side by side streams with each stream of the side by side streams being of noodles of one of the colors) to therebyform a bed of noodles in channel 264 consisting of noodles of one color and a bed of noodles in channel 266 consisting of noodles of the second color (in other words, to form side by side beds of noodles physically segregated from each other by divider 262 with noodles of one color in one bed and noodles of the second color in the other bed). Each bed has a vertical dimension, the same as that described above where a single bed is formed. Feeding from the restricted ooening is carried out simultaneously from the two beds so that noodles of both beds are choke fed into the final plodder. The soap tablets produced as a result of forming the variegated soap around the cores 200 are similar to the one depicted in FIG. 29 or FIG. 30.

Referring to FIGS. 31 and 32 involving the apparatus for recycling the soap chips with which U.S. Pat. No. 4,296,064 issued on Oct. 20, 1981 is involved (the specification for which is incorporated by reference herein), throughout FIGS. 31 and 32 there is shown a container 312 having an inwardly offset upper rim 314 sized to mate with the skirt 316 of a lid 318 having a handle 320. Within the container thus defined, water as at 322 is adapted to be positioned and above the water a rack 324 is suspended by means of its outwardly extending flange 326 on the rim 314. The rack may be separated by a septum 328 and 330 into four compartments. Within these compartments, soap chips are positioned around cores 340, 341, 342 and 343. Through an electrical connection plug 331 and a cord 332 leading to a plug 334 adapted to be connected to a source, a resistor element 340 within the bottom 342 may be heated while the device sits on a support 344. The result is that the water is heated, the soap chips are melted and new bars of soap surrounding the plastic cores 340, 341, 342 and 343 are made first by being turned into a liquid in the four segments of the rack and, after heating, the rack is removed allowing the soap bars to cool and the soap pieces made from the chips surrounding the plastic cores are removed for use.

In use, the soap chips are gathered together and placed in the four compartments shown. The electrical heating means is activated and the soap chips are melted into compartments previously containing the plastic cores, conforming the soap chips to the shape of the compartments and around the plastic cores. The heating means is deactivated and the rack cooled. The rack is then removed from the container and turned over, emptying the formed soap bars from the compartment.

The cores are preformed in accordance with processes set forth in FIGS. 15, 16, 17, 18, 21 and 22.

Figure 35:
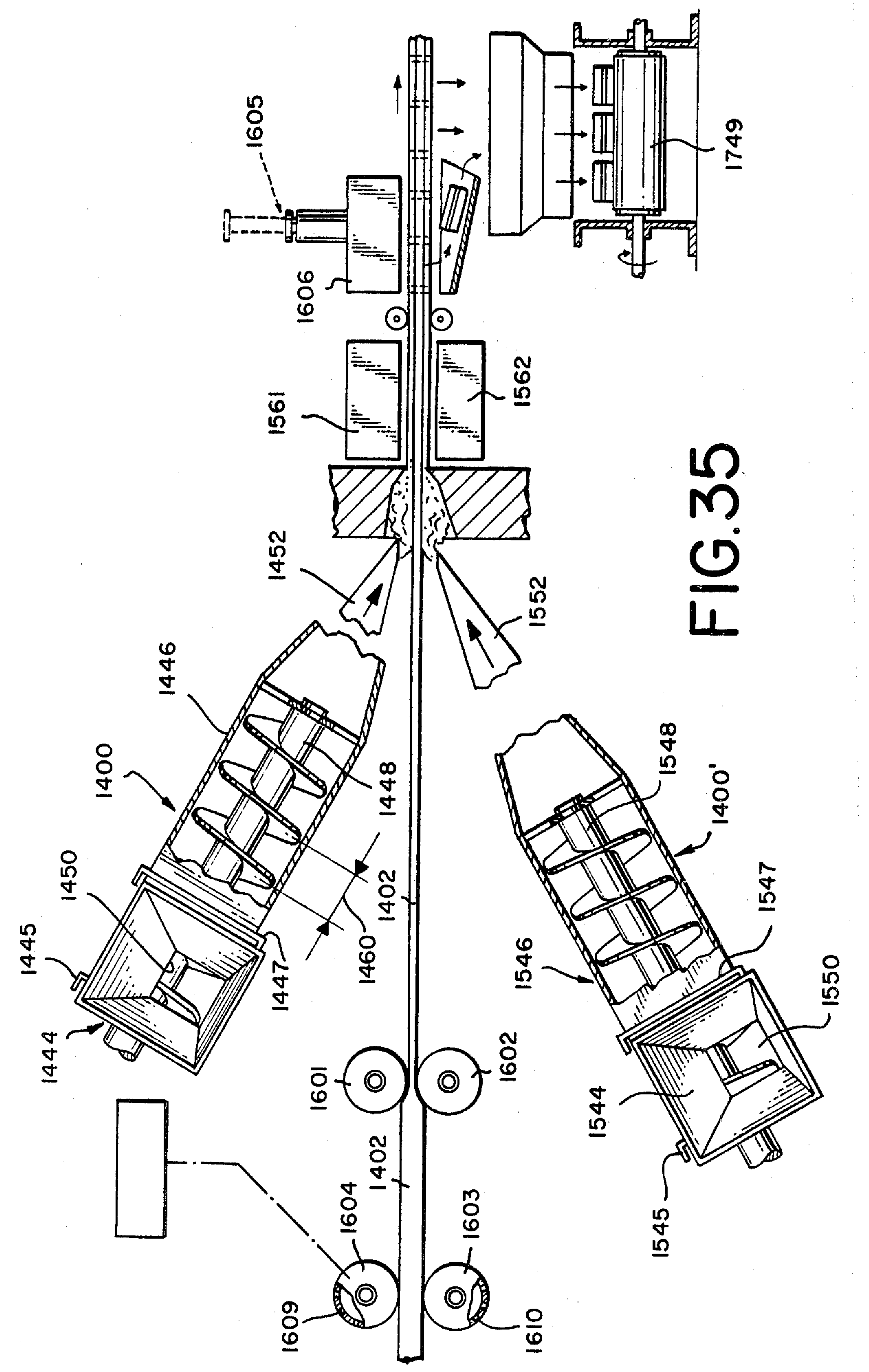
FIG. 35 is a plan view, partly broken away, illustrating preferred apparatus used for preparing the soap tablets containing plastic cores of our invention which soap tablets are illustrated in FIGS. 33 and 34 and which soao tablets are produced using dual extruder means.

Referring to FIGS. 33, 34 and 35 involving apparatus for forming the detergent tablets of our invention using dual extruders 1400 and 1400', soap noodles are choke fed through the restricted opening of outlets 1450 and 1550 of hoppers 1444 and 1544 into the final plodders 1446 and 1546. The constraining apparatus in the form of restricted openings have the effect of restricting lateral and longitudinal motion in the bed.

In the final plodders 1446 and 1546, the noodles are compacted and extruded to form soap logs 1401 and 1403. The temperatures of the soao logs 1401 and 1403 extruded from plodders 1446 and 1546 are preferably in the range of from about 85° F. up to about 150° F. by means of cooling jackets 1561 and 1562 adjacent to the plodder outlets throuqh which brine or other cooling agents are circulated. While temperatures of between 85° F. and 105° F. are preferred, temperatures have risen to 115° F. or higher without deleterious results. Rates through plodders 1546 and 1446 typically range from 40 to 90 pounds per minute with 60 to 75 pounds per minute being preferred. In usual operation, the soap logs extrude from the nozzles of the plodders at pressures ranging from about 100 to about 350 pounds per square inch, preferably ranging from about 150 to about 250 pounds per square inch.

The logs 1401 and 1403 emanating from outlets 1452 and 1552 of plodders 1446 and 1546 are then coated onto moving perfumed polymeric mass 1402 which is caused to move in the same direction as soap logs 1401 and 1403 by means of rollers 1601 and 1602. Hollow pressure rollers 1603 and 1604 having orifices 1609 and 1610 also rotate and during said rotation, perfume under high pressure, in a solvent such as liquid ammonia or other practical solvent, is imbibed into the polymeric sheet 1402 which is a microporous polymeric sheet capable of receiving in its micropores perfume imparted from pressure rollers 1603 and 1604 through orifices 1609 and 1610. Polymeric sheet 1402 then coated with sheets of soap 1401 and 1403 proceeds past the cutter/stamping means at 1606 whereupon cutter 1605 causes the sheets to be cut and stamped into tablets as illustrated in FIGS. 33 and 34. The tablets are then dropped onto conveyor 1749 for further treatment which includes polishing and, if desired, printing.

The following examples illustrate but do not limit the invention. Unless otherwise indicated, all temperatures are in degrees Celsius and all parts are by weight.

EXAMPLE I

Preparation of Vanilla Scent

The following formulation is prepared:

| Ingredients | Parts by Weight |
|---|---|
| Vanilla | 10.00 grams |
| Ethyl vanillin | 3.00 grams |
| Benzo dihydro pyrone | 3.00 grams |
| Heliotropin | 1.00 grams |
| Vanitrope (propenyl guaicol) | 0.50 grams |
| Balsam Peru | 1.00 grams |
| Aldehyde $C_{18}$:gamma nonyl lactone | 25.00 grams |
| Benzaldehyde:NF VII | 25.00 grams |

EXAMPLE II

Formulation for Obtaining Chypre "I" Scent

| Ingredients | Parts by Weight |
|---|---|
| American cedar oil | 200 |
| Patchouli oil | 50 |
| Vetiver oil | 30 |
| Bergamot oil | 150 |
| African geranium oil | 50 |
| Coumarin | 60 |
| Resinodour oak moss | 80 |
| Resinodour tolu | 200 |
| Resinodour labdanum | 150 |
| Musk xylene | 10 |
| Musk ambrette | 15 |

EXAMPLE III

Scented polyethylene pellets having a pronounced vanilla scent are prepared as follows:

Seventy-five pounds of polyethylene having a melting point of about 220° F. is heated to about 230° F. in a container of the kind illustrated in FIGS. 13 and 14. Twenty-five pounds of the vanilla formulation of Example I is then quickly added to the liquified polyethylene, the lid 84 is put in place and the agitating means 98 are actuated. The temperature is maintained at about 225° F. and the mixing is continued for about 5–15 minutes. The valve "V" is then opened to allow flow of the molten polyethylene enriched with the vanilla containing material to exit through the orifices 85. The liquid falling through the orifices 85 solidifies almost instantaneously upon impact with the moving cooled conveyor 87. Polyethylene beads or pellets 90 having a pronounced vanilla scent are thus formed. Analysis demonstrates that the pellets contain about 25% of the vanilla formulation so that almost no losses in the scenting substance didoccur. These pellets may be called "master pellets".

Fifty pounds of the vanilla-containing master pellets are then added to one thousand pounds of unscented polyethylene powder and the mass is heated to the liquid state. The liquid is molded into thin sheets of films. The sheets of films have a pronounced vanilla aroma.

EXAMPLE IV

One hundred pounds of polypropylene are heated to about 300° F. Thirty pounds of the essence as described in Example II are added to the liquified polypropylene. The procedure is carried out in the apparatus shown in FIGS. 13 and 14. After mixing for about eight minutes, the valve "V" is opened to allow the exit of polypropylene scented material mixture whereby solid pellets having a pronounced perfume smell were formed on the conveyor. The pellets thus obtained are then admixed with about twenty times their weight of unscented polypropylene and the mixture is heated and molded into flat discs. The flat discs have a strong and pleasant perfumed smell and scent.

EXAMPLE V

Thirty grams of the pellets produced according to Example III are placed onto apparatus as illustrated in FIGS. 15, 16 and 17. The apparatus is sealed and under a pressure of 182 atmospheres and at a temperature of 90°-100° C. in a nitrogen atmosphere, the resultant pellets are molded into cores. The platen is cooled and opened and the cores are released.

EXAMPLE VI

The flat discs produced according to Example IV are ground into powder and the powder is placed in twenty gram quantities onto the platen as illustrated in FIGS. 15, 16 and 17. The platens 111 are sealed and pressed together at a pressure of 250 atmospheres and a temperature of 80°-95° C. for a period of 2.5 hours. At the end of the 2.5 hours, the platens are cooled and opened yielding cores 112 as shown in FIG. 18 for utilization in the detergent bars as set forth in the examples infra.

EXAMPLE VII

The following formulation is prepared:

| Ingredients | Percent |
|---|---|
| Gelatin (225 grams Bloom, Type A) | 10.5 |
| Glycerin | 15.8 |
| Sucrose | 7.9 |
| $KAl(SO_4)_2$ 12 $H_2O$ | 1.6 |
| Hydrochloric acid (50% by volume aqueous solution) | 1.1 |
| Deriphat 160C (30% aqueous solution of the partial sodium salt of N—lauryl betaimiodipropionate, mfg. by General Mills, Inc.) | 63.1 |

The components of the above formula are blended together and heated with stirring at a temperature in the range of 60°-80° C. to dissolve the gelatin and the various other materials. After about 5 to 10 minutes, a clear solution or gel is obtained, which is poured into shaped molds previously containing cores produced in Example V, as illustrated in FIG. 21 and chilled to 15° C. After solidification which takes about 8 minutes, the elastic detergent bar having an aromatized core therein is removed from the mold and is ready to use.

The product is satisfactorily elastic and cleans well when employed as a bath or hand "soap" although the foaming effects thereof are not as good as when preferred anionic detergents are employed instead of the amphoteric detergent component. However, the bar is a useful washing product and maintains its elasticity and strength thereof throughout repeated washings and dryings until the soap is completely used up and the only thing remaining is the plastic core 112.

When the formula is modified so that the weights of all components except the Deriphat 160C are maintained the same and the amount of Deriphat 160C is increased to 68.4 parts, essentially the same type of elastic detergent bar results. Also, when the alum is replaced by urea, good elastic detergent bars of essentially the same properties are produced. However, with neither the alum cross-linking agent nor the urea denaturant, present products of the described formulation are somewhat more flexible and softer to the touch.

When the formula is modified to replace the sucrose with propylene glycol, a useful product of comparable properties is obtained, which is also the situation when the total percentage of glycerine and other dihydric or polyhydric compound present (propylene glycol and/or sucrose and/or dextrose) is reduced to 5 and 10%. Reduction of the "plural hydric" alcohol content usually results in firmer or harder gels which are especially satisfactory for the present detergent bars. When the proportions of Deriphat 160C is reduced to 30, 40 and 50% of the product (9, 12 and 15% active ingredient), diminutions in forming power result but the bar becomes firmer. A similar firming effect is obtained when 300 grams Bloom gelatin is employed instead of that of 225 grams Bloom or when more gelatin is employed. Of course, formula modifications will be made with the guidance of this disclosure to produce the best products for particular applications In making all the variations of the formula mentioned above, the processes employed are the same.

EXAMPLE VIII

The procedure of Example VII is followed except the formula used is as follows:

| Ingredients | Percent |
|---|---|
| Gelatin (225 grams Bloom, Type A) | 10.0 |
| Glycerol | 5.0 |
| Dextrose | 5.0 |
| Urea | 1.0 |
| Triethanolamine lauryl sulfate | 15.0 |
| Ethanol | 4.3 |
| Lauric myristic diethanolamide | 4.0 |
| Methyl cellulose | 0.6 |
| Formaldehyde | 0.1 |
| Perfume | 0.2 |
| Other adjuvants and impurities (NaCl, dyes, fluorescent brighteners, triethanolamine, citric acid) | 3.6 |
| Water | 51.2 |

and the core used is produced according to Example VI. Similar results are obtained as in the previous Example VII.

EXAMPLE IX

The apparatus utilized is that depicted in FIGS. 23, 24, 25, 26, and 27 of the drawings. The preplodders are each equipped with a cooling jacket. The plate 218 has a 10" diameter and contains perforations of diameter of about ⅛". The plate 230 has a 10" diameter and contains perforations of diameter of about ⅛". The final plodder has a worm diameter of about 16" and the flight distance of about 9.75". The outlet from hopper 244 is designed to provide a stream of noodles into plodder 246 which is rectangular in cross-section. The outlet 250 from the hopper 244 has a dimension in the cross machine direction (with respect to the final plodder 246) of about 8" and a dimension in the machine direction (with respect to plodder 246) of about 9.75".

A soap mass in the form of white chunks having the following composition is fed into preplodder 212:

| | |
|---|---|
| Tallow and coconut sodium soaps at 50% each by weight | 78.5% |
| Coconut fatty acid | 7.0% |
| Water | 11.0% |

-continued

| | |
|---|---|
| NaCl | 1.1% |
| Sanitizer | 0.5% |
| Perfume composition of Example I | 1.6% |
| Miscellaneous and $TiO_2$ whitener | Balance to 100.0% |

A soap mass in the form of blue chunks having a composition similar to that set forth in the above paragraph is fed into preplodder 224.

Both the white and blue soap masses enter the respective preplodders at a temperature of about 90° F.

The preplodder 212 compacts the white soap chunks and extrudes the compacted chunks through the perforations in plate 218. Knife edge 220 is rotated to produce white noodles of diameter of about 0.5" and length of about 0.75". Cooling fluid is circulated through the cooling jacket of preplodder 212 to maintain the temperature of the extruded noodles at about 90° F.

The preplodder 224 compacts the blue soap chunks and extrudes the compacted chunks through the perforations in plate 230. Knife edge 232 is rotated to produce blue noodles of diameter of about ⅛" and length of about 1.5". Cooling fluid is circulated through the cooling jacket of preplodder 224 to maintain the temperature of the extruded noodles at about 95° F.

Soap masses are fed by conveyors 210 and 222 and the preplodders 212 and 224 are run so that the weight ratio of white noodles to blue noodles produced is about 3.5 to 1.

The white and blue noodles are guided into a common stream by chutes 240 and 242 and are intermingled and the intermingled noodles fall by gravity to form a bed of noodles about 10" deep in hopper 244. Noodle feed is continued by conveyors 210 and 222 to maintain that approximate bed depth. A vacuum of 27 inches of mercury is drawn on conduit 234 through conduit 236.

The restricted opening into the final plodder has the effect of restricting lateral and longitudinal motion in the noodle bed in hopper 244.

The final plodder is choke fed from that noodle bed at a rate sufficient to provide a throughput of about 65 pounds per minute. Feed rates from conveyors 210 and 222 are consistent with this throughput rate. The stream of noodles entering the plodder 246 has a rectangular cross section with a dimension in the cross machine direction (with respect to plodder 246) of about 8" and a dimension in the machine direction (with respect to plodder 246) of about 9.75".

In plodder 246, the worm 248 rotates to compact the intermingled noodles and extrude the same into a soap log having a variegated appearance. The soap log extrudes from the nozzle of the plodder at a pressure of about 160 lbs/square inch.

The soap log is then heated to a thixotropic flowable mass in conduit 701 heated by heating element 702 from electrical heating source 703 and the resultant mass is put on conveyor 719 into cups 208 driven by roller 209 and continuously heated from heating source 704. Simultaneously, plastic cores 200 on conveyor 201 driven by rollers 202 and 203, said cores being produced according to the processes of Example V or VI, are fed into cups 208 already containing the thixotropic variegated soap liquid and are kept in place by microplunger 207 as illustrated in FIG. 23. Cooler 706 then cools the soap containing the aromatized core and the resulting solid aromatized core-containing soap is then packaged at 719.

What is claimed is:

1. An apparatus useful for carrying out a process for molding aromatized and aromatizing core-containing detergent bars comprising:

1. means for producing aromatized plastic pellets;
2. associated with said means for producing said aromatized plastic pellets, and operating simultaneously therewith, means for forming the aromatized plastic pellets into aromatized plastic cores;
3. associated with said means for forming the aromatized plastic pellets into aromatized plastic cores and operating simultaneously therewith, means for casting a detergent around the aromatized plastic cores in the liquid phase and means associated with the casting means and operating simultaneously therewith for cooling the resulting liquid detergent cast around the plastic cores.

2. Apparatus for forming aromatized core-containing detergent bars which detergent bars comprise an aromatized plastic lamina core having an edge, an upper substantially flat surface and a lower substantially flat surface and coated on said upper flat surface a detergent in the solid phase and coated on said lower flat surface a detergent in the solid phase comprising:

1. means for forming a continuous aromatized microporous polymeric sheet and means for moving said sheet laterally, said polymeric sheet having a substantially flat upper surface, a substantially flat lower surface and two continuous edges;
2. plodder means for directing a detergent onto said upper surface of said polymeric sheet in substantially the same direction of movement as said polymeric sheet;
3. plodder means for directing a detergent layer onto said lower surface of said polymeric sheet in substantially the same direction of movement as the movement of said polymeric sheet stamping means caused to operate simultaneously with said plodder means at a location downstream from both of said plodder means whereby said stamping means stamp soap bars from said polymeric sheet coated on each of its surfaces with soap.

* * * * *